(12) United States Patent
Palmaers

(10) Patent No.: US 12,059,839 B2
(45) Date of Patent: *Aug. 13, 2024

(54) DEVICE AND METHOD OF FEEDING A THERMOPLASTIC FILAMENT

(71) Applicant: Industriële Constructies Symons BVBA, Peer (BE)

(72) Inventor: Jonathan Palmaers, Meeuwen Gruitrode (BE)

(73) Assignee: INDUSTRIËLE CONSTRUCTIES SYMONS BVBA, Peer (BE)

( * ) Notice: Subject to any disclaimer, the term of this patent is extended or adjusted under 35 U.S.C. 154(b) by 490 days.

This patent is subject to a terminal disclaimer.

(21) Appl. No.: 17/334,199

(22) Filed: May 28, 2021

(65) Prior Publication Data

US 2021/0347110 A1    Nov. 11, 2021

Related U.S. Application Data

(63) Continuation-in-part of application No. 17/297,256, filed as application No. PCT/IB2019/059235 on Oct. 28, 2019, now Pat. No. 11,911,966.

(30) Foreign Application Priority Data

Nov. 29, 2018   (BE) .................................... 2018/5836

(51) Int. Cl.
   *B29C 64/118*   (2017.01)
   *B29C 64/209*   (2017.01)
   (Continued)

(52) U.S. Cl.
   CPC .......... *B29C 64/118* (2017.08); *B29C 64/209* (2017.08); *B29C 64/321* (2017.08);
   (Continued)

(58) Field of Classification Search
   CPC ... B29C 64/118; B29C 64/321; B29C 64/209; B65H 51/10; B33Y 30/00; B33Y 10/00
   See application file for complete search history.

(56) References Cited

U.S. PATENT DOCUMENTS

| 3,014,519 | A | 12/1961 | Wright |
| 3,738,555 | A | 6/1973 | Karnes et al. |

(Continued)

FOREIGN PATENT DOCUMENTS

| EP | 585779 A2 | 3/1994 |
| WO | 2009134300 A2 | 11/2009 |

OTHER PUBLICATIONS

International Search Report and Written Opinion mailed Jan. 27, 2020 in related International Application No. PCT/IB2019/059235.

*Primary Examiner* — Mathieu D Vargot
(74) *Attorney, Agent, or Firm* — Dinsmore & Shohl LLP

(57) ABSTRACT

An extrusion-based production system, comprising: a filament roll with a filament; at least one assembly with: an entrance for receiving the filament; an exit for delivering the filament, a channel between the entrance and exit; a first and second rotatable component, respectively rotatable about a first/second axis, and having first/second external ridges, wherein, when a filament is introduced into the channel, and the at least one assembly is rotated with respect to the filament, the rotatable components rotate about their respective axis, and the axes move about the filament such that the components mainly roll over the filament, and the external ridges penetrate at least partially into the filament. A method for feeding a filament.

23 Claims, 26 Drawing Sheets

(51) Int. Cl.
*B29C 64/321* (2017.01)
*B65H 51/10* (2006.01)
B33Y 10/00 (2015.01)
B33Y 30/00 (2015.01)

(52) U.S. Cl.
CPC .............. *B65H 51/10* (2013.01); *B33Y 10/00* (2014.12); *B33Y 30/00* (2014.12)

(56) References Cited

U.S. PATENT DOCUMENTS

| | | |
|---|---|---|
| 3,746,232 A | 7/1973 | Kirillov et al. |
| 4,426,046 A | 1/1984 | Heuckroth |
| 7,896,209 B2 | 3/2011 | Batchelder et al. |

Pitch = 0.5 mm

Pitch = 1 mm

Pitch = 1.5 mm

Pitch =1.5mm (3 helix)

DEVICE AND METHOD OF FEEDING A THERMOPLASTIC FILAMENT

CROSS-REFERENCES TO RELATED APPLICATIONS

This application is a continuation-in-part of U.S. patent application Ser. No. 17/297,256, filed May 26, 2021, now U.S. Pat. No. 11,911,966, which is a national-stage application under 35 U.S.C. § 371 of International Application No. PCT/IB2019/059235, filed Oct. 28, 2019, which International Application claims benefit of priority to Belgian Patent Application No. BE2018/5836, filed Nov. 29, 2018. All of the foregoing applications are incorporated by reference herein in their entireties.

TECHNICAL FIELD

The present disclosure relates to devices and methods for feeding a filament into an extrusion-based system. More specifically, the present disclosure relates to an extrusion-based production system with a filament feed mechanism, and a method for feeding a filament that is or comprises a thermoplastic material, e.g. an apparatus for additive manufacturing, e.g. a 3D printer.

BACKGROUND

Extrusion-based systems in which a filament of a thermoplastic material is supplied, melted, and deposited on an object to be formed are known in the art, e.g. in the field of 3D printers.

FIG. 1 shows a schematic block diagram of a known extrusion-based system. It comprises a filament spool 101, on which a filament 102 is wound. The filament is guided to an extruder 103 via a bent path. The extruder 103 of FIG. 1 has a feed mechanism based on two pinch rollers 107, 108. By causing these rollers 107, 108 to rotate at an adjustable speed, the feed speed of the material can be controlled. A heating unit 104 melts the filament, and the molten material is deposited by a nozzle 105. By moving the nozzle in three directions X, Y, Z by means of a displacement mechanism (not shown), and by feeding the filament at an appropriate speed, a 3D object can be formed layer by layer on a substrate 106. The system is controlled by an external computer (not shown), which computer contains e.g. a 3D model of the object to be formed.

FIG. 2A and FIG. 2B show a problem that can occur with this system under certain circumstances, e.g. when the pinch rollers want to propel the filament 102, but because of insufficient force, instead scrape material off of the filament. It will be understood that this drastically disrupts the production process.

U.S. Pat. No. 7,896,209B2 describes another known system, as shown in FIG. 3 to FIG. 5 of the present document. FIG. 3 shows a front view of an extrusion-based digital production system 300 comprising a building chamber 312, and a substrate 314, a gantry 316, an extrusion head 318, and a filament feed source 320, wherein extrusion head 318 comprises a drive mechanism 322. The drive mechanism 322 is a filament drive mechanism using a rotatable component 330 having an internal screw thread surface 332 (see FIG. 5), for feeding successive portions of filament 324 from filament feed source 320 during a build-up operation with the system 300.

FIG. 4 shows how an electric motor 334 drives the rotatable component 330.

FIG. 5 shows how the internal screw thread of the rotatable component 330 engages the filament 324, thereby advancing the filament.

It is also known, e.g. from US2017144222(A1), incorporated herein by reference in its entirety, to produce a mainly metallic or ceramic 3D-object by a process which includes the step of printing a so called "green body" using a filament comprising a metal and/or ceramic powder and a thermoplastic binder. The production speed and quality strongly depends on the feeding of the filament, at the correct speed, without breaking and without slipping.

There is always room for improvements or alternatives.

SUMMARY

It is an aim of embodiments disclosed herein to provide an extrusion-based production system.

It is an aim of embodiments disclosed herein to provide a method of feeding a thermoplastic filament in an extrusion-based production system, or a filament that comprises a thermoplastic material such as e.g. a filament comprising a metal and/or ceramic powder and a thermoplastic binder. In this sense, a filament comprising a metal and/or ceramic powder and a thermoplastic binder may be a filament comprising a metal powder and a thermoplastic binder, a filament comprising a ceramic powder and a thermoplastic binder, or a filament comprising a combination of a metal powder and a ceramic powder and a thermoplastic binder.

It is an aim of embodiments disclosed herein to provide a method of feeding a filament comprising a metal and/or ceramic powder and a thermoplastic binder, wherein the thermoplastic binder comprises a thermoplastic material, e.g. a thermoplastic polymer or a thermoplastic compound.

It is an aim of embodiments disclosed herein to provide a method of feeding a filament comprising a metal and/or ceramic powder and a thermoplastic binder, wherein the thermoplastic binder comprises a thermoplastic polymer and at least one plasticizer, e.g. as described in US2017144222 (A1).

It is an aim of embodiments disclosed herein to provide an assembly, and a filament feed system, and a method for supplying a thermoplastic filament or a filament comprising a thermoplastic binder in an extrusion-based production system, with an accurate throughput speed (e.g. with a very linear curve of supplied amount of material versus requested/set amount of material, or e.g. with a very flat ratio of delivered amount of material versus requested/set amount of material).

It is an aim of embodiments disclosed herein to provide a filament feed mechanism and a corresponding method with a reduced risk of heating and/or melting and/or scraping off of the filament within the feed mechanism, and/or with a reduced risk of breaking the filament.

Thereto, the present disclosure provides an assembly, a filament feed system, an extrusion-based production system, and a method according to embodiments disclosed herein.

According to a first aspect, the present disclosure provides an extrusion-based production system comprising: a filament roll with a filament to be extruded, the filament being a thermoplastic filament or a filament comprising a metal and/or ceramic powder and a thermoplastic binder; and at least one assembly for feeding the filament, wherein the at least one assembly comprises the following: an entrance for receiving the filament; an exit for delivering the filament, the entrance and exit defining a channel within which the filament will move; at least two rotatable components comprising a first rotatable component and a second rotatable component; wherein the channel is at least partially located between the first component and the second component; wherein the first rotatable component is rotatable about a first axis and has first external ridges, said first axis being located at a first distance from the channel such that the first external ridges at least partially penetrate the channel; wherein the second rotatable component is rotatable about a second axis different from the first axis and has second external ridges, said second axis being located at a second distance from the channel such that the second external ridges at least partially penetrate the channel; wherein the first and second rotatable components are mounted such that, when the filament is inserted into the channel and when the assembly is rotated relative to the filament, the first rotatable component rotates about the first axis, and the second rotatable component rotates about the second axis, and the first and second axes move about the filament in such a manner that the first and second rotatable components mainly roll over a surface of the filament, and that the first and second external ridges penetrate the filament about 0.05 mm to about 0.25 mm.

As a result, at least one groove is formed in the filament, causing the filament to be moved precisely axially, without breaking the filament.

In case a powder-based filament with a thermoplastic binder is used, said thermoplastic binder preferably has a melting temperature in the range from 100° C. to 190° C., and the filament preferably has a shore A hardness value in the range from 85 to 95.

In an embodiment, the filament comprises a powder comprising or consisting of an elemental metal, such as aluminum or copper or tungsten or molybdenum.

In an embodiment, the filament comprises a powder of a metal alloy, such as an alloy comprising Nickel and Chrome and Iron (NiCrFe), also known as Inconel.

In an embodiment, the filament comprises a powder of a ceramic, such as e.g. zirconia, alumina, silicon carbide.

In an embodiment, the filament comprises a powder of stainless steel, e.g. 316 stainless steel, or 17-4 PH stainless steel, or H13 tool steel, or A2 tool steel.

In an embodiment, the ridges are provided to penetrate to a depth approximately equal to 0.06 mm, or approximately 0.08 mm, or approximately 0.10 mm, or approximately 0.11 mm, or approximately 0.12 mm, or approximately 0.13 mm, or approximately 0.14 mm, or approximately 0.15 mm, or approximately 0.18 mm, or approximately 0.20 mm, or approximately 0.22 mm, or approximately 0.23 mm; or approximately 0.24 mm.

The filament preferably has a circular cross-section.

The channel is preferably a cylindrical channel.

Preferably, the first distance is equal to the second distance.

It is an advantage that the assembly is extremely suitable for driving the filament in the axial direction, because of engagement of the ridges in the filament.

It is a major advantage that the rotatable components mainly roll over the filament, but are also partially pressed into the filament, because such movement essentially exhibits 'rolling friction', and only a slight or reduced 'sliding friction' (or 'slip'). As a result, the advancement of the filament proceeds more smoothly and accurately, and the torsion exerted on the filament is greatly reduced.

The filament has a known (predetermined) diameter. This diameter may be standardized.

Preferably, the external ridges have a tapered end (in the radial direction, away from the axis of rotation), or a pointed end, or an end with a circular cross section, or an end with a triangular cross section, or an end with a trapezoidal cross section, or a cross section with a convex end. 'End' means the part that penetrates into the filament.

In other words, the external ridges roll mainly or largely over the filament, while one end thereof penetrates into the filament and forms grooves or runs in the grooves already made, and thus displaces the filament axially.

The outer diameter of the rotatable components is preferably at least twice the diameter of the filament, preferably at least a factor of 3, or at least a factor of 4, or at least a factor of 5, but preferably at most a factor of 15, or at most a factor of 12, or at most a factor of 10.

In an embodiment, the assembly further comprises the filament, received in the channel.

In an embodiment, the axes of the rotatable components are substantially parallel, i.e. parallel, or crossing at an angle of at most 15° to one another.

In an embodiment, each of the at least two rotatable components is in contact with the filament by means of at least three different ridge segments, which are axially displaced relative to each other (in the longitudinal direction of the filament).

In other words, if the ridges form a screw thread, at least three 'crests' or 'tops' of the screw thread are in contact with the filament in this embodiment. Or if the external ridges form discs or rings or dishes, at least 3 discs or rings or dishes are in contact with the filament. If the assembly contains two rotatable components, there are at least 6 different engagement locations of the rotatable components and the filament. If the assembly contains three rotatable components, each with at least three ridge segments in engagement with the filament, there are at least nine different engagement locations of the rotatable components and the filament.

It is an advantage that the filament is engaged at multiple locations, because in this way the total load exerted on the filament is distributed over a plurality of contact locations, the stress or force exerted on the filament at each individual location is reduced, and the risk of breaking the filament is reduced.

In an embodiment, the assembly further comprises at least four bearings; and the first and second rotatable component are each mounted by means of two of the at least four bearings.

In an embodiment, the at least one assembly further comprises a ring gear; and each of the at least two rotatable components further comprises a gearwheel that engages the ring gear to cause at least the first component and the second component to synchronously rotate about their respective axes.

Such a drive is comparable to a planetary drive or a planetary gear with a ring gear, wherein the gears of the rotatable components function as planet gears.

In an embodiment, the at least one assembly further comprises a central gearwheel having a central aperture for passage of the filament; and each of the at least two rotatable components comprises a gearwheel that engages the central gearwheel to synchronously rotate the first component and the second component about their respective axes.

Thanks to the synchronous rotations, it is ensured that the tracks in the filament do not join, and that the tracks are not warped.

Such a drive is comparable to a planetary drive or a planetary gear with a central sun gear, wherein the gears of the rotatable components function as planet gears.

In embodiments where the drive mechanism has at least three components, the third component also comprises a gearwheel that engages the central gearwheel to synchronously rotate the three gearwheels about their respective axes.

In an embodiment, the assembly further comprises a third and a fourth component positioned such that the channel is at least partially located in the space between the first and the second and the third and the fourth component, and wherein the third component and the fourth component each have a surface that touches or almost touches the channel.

Preferably, the first and second components are opposite each other relative to the channel, and the third and fourth components are also opposite each other relative to the channel.

In this embodiment, the filament is substantially clamped between the first and second rotatable component. The third and fourth components serve only to keep the filament within the channel. Preferably, at least a portion of the surface of the third and fourth components that may come into contact with the filament is smooth, e.g. polished and/or coated.

In an embodiment, the first axis of the at least one assembly is substantially parallel to the channel; and the second axis is substantially parallel to the channel; and the first ridges form a first external screw thread; and the second ridges form a second external screw thread; and the movements of the at least two rotatable components are synchronized by means of gearwheels.

Preferably, the lead of the second external screw thread is equal to the lead of the first external screw thread.

The first and second external screw threads are preferably helical, with a constant lead. The screw thread can be a single-start thread, or it can be a multiple-start thread.

In these embodiments, the rotatable components with axes parallel to the channel, and with screw threads, ensure that the filament will move in the axial direction relative to the assembly.

In this embodiment, annular grooves or recesses are formed in the filament. Thanks to the synchronization by means of gearwheels, the annular grooves can be clearly separated and remain separated, and the grooves can be prevented from eroding and/or merging, which would reduce the accuracy.

It is an advantage of this assembly that it has an almost perfect transfer characteristic, with a very linear behavior (exit speed of the filament versus requested speed of the filament), or a very flat transfer ratio, up to a certain maximum counter pressure.

In an embodiment, the at least one assembly further comprises a third rotatable component having a third external screw thread, wherein the third rotatable component is rotatable about a third axis different from the first and second axes, said third axis being substantially parallel to the channel and located at a distance from the channel such that the third external screw thread at least partially penetrates the channel, and wherein the channel is at least partially located between the first component and the second component and the third component; and wherein the third rotatable component is mounted such that, when a filament (e.g., of standardized dimensions) is inserted into the channel and when the assembly is rotated relative to the filament, the third rotatable component mainly rolls over a surface of the filament.

It is an advantage of this embodiment that rotation of the third component about the third axis contributes to the advancement of the filament through the channel because of engagement of the third external screw thread and the filament.

It is an advantage of this embodiment that rotation of the third component about the third axis contributes to reducing the friction between the filament and the third component, causing the advancement of the filament to proceed more smoothly and/or accurately.

In an embodiment, the rotatable components are made of brass. Tests using thermoplastic filaments, but also powder based filaments comprising a thermoplastic binder material, have shown a very good resistance to wear. But of course, other materials can be used as well, such as for example steel, or hardened steel.

In an embodiment, the first axis of the at least one assembly is provided to cross the filament at an angle of 1.0° to 9.0°; and the second axis is provided to cross the filament at an angle of 1.0° to 9.0'; and the first ridges form a plurality of first rings; and the second ridges form a plurality of second rings.

In these embodiments, the rotatable components with inclined axes relative to the channel ensure that the filament will move in the axial direction relative to the assembly.

A major advantage of this embodiment is that the rotational movements of the rotatable components about their respective axes need not be explicitly synchronized by means of gearwheels. In other words, a major advantage of this embodiment is that these gearwheels can be omitted, which is easier to produce, and which has a lower weight, hence is easier to drive.

In an embodiment, the assembly further comprises a third rotatable component rotatable about a third axis different from the first and the second axis; and the third axis crosses the channel at an angle of 1.0° to 9.0°; and the first, second and third ridges comprise a plurality of rings.

Preferably, the second axis assumes the position of the first axis after it has been displaced through 120° around the filament, and preferably the third axis assumes the position of the first axis after it has been displaced through 240° around the filament. Thus, at any point in time, none of the axes are parallel to each other nor parallel to the channel, but are crossing.

In an embodiment, the first, second and third rotatable components are shaped and positioned such that the at least one groove formed by the first, second and third ridges form a single helix, or two individual helices, or three individual helices.

In an embodiment, each of the rotatable components comprises at least three or at least four or at least five or at least seven rings.

In an embodiment, the plurality of rings on each rotatable component are equidistant rings. In other words, in this embodiment, the rings of each rotatable component, considered separately, are at a constant distance from each other.

In an embodiment, the plurality of rings all have the same external diameter.

In an embodiment, at least one of the plurality of rings has a first external diameter; and at least one other of the plurality of rings has a second external diameter different from the first diameter.

In this way, for example, a gradually increasing or a constant penetration depth of the rings in the filament can be obtained.

In an embodiment, the extrusion-based production system further comprises: at least one rotation limiting unit positioned at the entrance or at the exit of the at least one assembly so as to limit torsion of the filament.

In an embodiment, the filament feed system further comprises: at least one pressure roller assembly arranged at the entrance or at the exit of the assembly so as to limit torsion of the filament.

In an embodiment, the rotation limiting unit comprises at least two pinch rollers or at least two pressure rollers.

In an embodiment, the filament roll is arranged in such a way that a filament coming from the filament roll is introduced into the entrance of the assembly according to a bent curve.

In an embodiment, the extrusion-based production system further comprises: at least one drive mechanism provided to rotate the at least one assembly relative to the filament.

In an embodiment, the drive mechanism is operatively connected to a timing-belt pulley of the at least one assembly.

Preferably, the drive mechanism is a synchronous drive mechanism.

In an embodiment, the extrusion-based production system comprises: a first assembly provided to displace the filament in a first direction; and a second assembly similar to the first assembly, provided to also displace the filament in the first direction; and a drive mechanism for causing the rotatable components of the first assembly to rotate in a first direction relative to the filament, and for causing the rotatable components of the second assembly to rotate in a second direction relative to the filament, opposite to the first direction, so as to reduce or substantially eliminate torsional forces exerted by the first assembly.

It is an advantage of this embodiment that the first torsion exerted by the first assembly on the filament, despite already being small, and the second torsion, induced by the second assembly (despite already being small) counteract one another, so that the resulting torsion is further reduced.

It is an advantage of the cascading of two assemblies that the axial force exerted on the filament is increased, for example substantially doubled. This further reduces the risk of the filament shifting relative to the ridges or teeth.

In an embodiment, the drive mechanism comprises an electric motor and a synchronous drive, e.g., a toothed drive belt, or a chain or gearwheels.

In an embodiment, the at least one drive mechanism further comprises an electric motor to rotate the at least one assembly relative to the filament.

In an embodiment, the at least one drive mechanism further comprises a drive belt to couple the at least one assembly to the electric motor.

In an embodiment, the electric motor is a motor having a hollow shaft, and the hollow shaft is configured to receive the filament, and the motor is configured to rotate the at least one assembly relative to the filament.

In an embodiment, the extrusion-based production system further comprises a control unit, which is communicatively connectable to an external computer and is provided for receiving information for controlling the at least one drive mechanism.

The control unit may, for example, be configured to receive position information, and an amount of material to be deposited at the received position.

In an embodiment, the extrusion-based production system further comprises a heating element, provided to melt the fed through thermoplastic filament, or to melt the thermoplastic binder material of the powder based filament.

In an embodiment, the extrusion-based production system is a 3D printer.

According to a second aspect, the present disclosure also provides a method of feeding through a filament in an extrusion-based production system comprising a filament roll with a filament (2) to be extruded, the filament being a thermoplastic filament or a filament comprising a metal and/or ceramic powder and a thermoplastic binder; and at least one assembly comprising the following: an entrance for receiving the filament to be extruded; an exit for delivering the filament, the entrance and exit defining a channel within which the filament will move; at least two rotatable components comprising a first rotatable component and a second rotatable component; wherein the channel is at least partially located between the first component and the second component; wherein the first rotatable component is rotatable about a first axis and has first external ridges, said first axis being located at a first distance from the channel such that the first external ridges at least partially penetrate the channel; wherein the second rotatable component is rotatable about a second axis different from the first axis and has second external ridges, said second axis being located at a second distance from the channel such that the second external ridges at least partially penetrate the channel; and the method comprising the following steps: a) introducing the filament into the channel; b) rotating the first rotatable component about the first axis or allowing the first rotatable component to rotate about the first axis, and rotating the second rotatable component about the second axis or allowing the second rotatable component to rotate about the second axis, and moving the first and second axes about the filament in such a manner that the first and second rotatable components mainly roll over a surface of the filament and that the first and second external ridges penetrate the filament about 0.05 mm to about 0.25 mm.

According to a third aspect, the present disclosure also provides an assembly for feeding the filament, comprising: an entrance for receiving the filament to be extruded; an exit for delivering the filament, the entrance and exit defining a channel within which the filament will move; at least two rotatable components comprising a first rotatable component and a second rotatable component; wherein the channel is at least partially located between the first component and the second component; wherein the first rotatable component is rotatable about a first axis and has first external ridges, said first axis being located at a first distance from the channel such that the first external ridges at least partially penetrate the channel; wherein the second rotatable component is rotatable about a second axis different from the first axis and has second external ridges, said second axis being located at a second distance from the channel such that the second external ridges at least partially penetrate the channel; wherein the first and second rotatable components are mounted such that, when the filament is inserted into the channel and when the assembly is rotated relative to the filament, the first rotatable component rotates about the first axis, and the second rotatable component rotates about the second axis, and the first and second axes move about the filament in such a manner that the first and second rotatable components mainly roll over a surface of the filament; and wherein the first axis is substantially parallel to the channel; and wherein the second axis is substantially parallel to the channel; and wherein the first ridges form a first external screw thread; and wherein the second ridges form a second external screw thread; and wherein the movements of the at least two rotatable components are synchronized by means of gearwheels.

In an embodiment, the first and second rotatable components are mounted such that the first and second external ridges penetrate the filament about 0.05 mm to about 0.25 mm.

In an embodiment, the assembly further comprises a third rotatable component having a third external screw thread.

BRIEF DESCRIPTION OF THE DRAWINGS

With specific reference to the drawings, it is emphasized that the details shown serve only as an example and only for the illustrative discussion of the various embodiments disclosed herein. They are proposed for providing what is regarded as the most useful and immediate description of the principles and conceptual aspects of the present disclosure. In this respect, no attempt is made to show more structural details than is necessary for a fundamental understanding. The description in combination with the drawings makes it clear to a person skilled in the art how the various disclosed forms can be carried out in practice.

FIG. 3 shows a front view of an extrusion-based digital production system known in the art, with a drive mechanism using a rotatable component having an internal threaded surface.

FIG. 4 is an enlarged view of the drive mechanism of FIG. 3, wherein a motor drives a component with an internal screw thread.

FIG. 5 shows an enlarged view of how the internal screw thread engages the filament, makes grooves in the filament, thereby advancing the filament.

FIG. 6 to FIG. 12 and FIG. 14 to FIG. 19 illustrate a first illustrative embodiment of an assembly, as can be used in embodiments according to the present disclosure.

FIG. 6 shows an arrangement of three rotatable components with edges (or protruding parts) in the form of external screw thread in engagement with a filament. The axes of the rotatable components are parallel to the channel.

FIG. 7 is a cross-sectional view and shows how the screw thread of the components of FIG. 6 engages the filament.

FIG. 8 is an enlargement of a portion of FIG. 7.

FIG. 9 shows an exploded view of the three rotatable components of FIG. 6 and an assembly comprising these three rotatable components, with bearings and gearwheels.

FIG. 10 shows (left) an assembly based on the components of FIG. 9, in assembled form. Together with the motor and the belt and the grip rollers, the whole forms a filament feed system.

FIG. 11 shows a cross section of the feed mechanism of FIG. 10 in the planes alpha and beta.

FIG. 12 shows an example of a filament feed system as can be used in embodiments disclosed herein.

FIG. 15 shows how, in the first embodiment, the movements of the rotatable components (rotation about their respective axes+displacement of the axes about the filament) can be synchronized by means of gearwheels and a ring gear.

FIG. 16 to FIG. 19 are screenshots of a computer simulation that represent the movement of one of the components. As shown, the component is rotated about its own axis, and the axis itself is displaced around the filament.

FIG. 20 is a top view of the three components and of the central gearwheel.

FIG. 21 is a perspective view showing the relative position of the components and the filament and the central gearwheel.

FIG. 22 shows an exploded view of the three rotatable components and the central gearwheel of FIG. 22, and an assembly comprising these three rotatable components, as well as bearings, and gearwheels.

FIG. 23 shows a top view on FIG. 22 in which two planes alpha and beta are defined, and wherein a portion is cut away for illustrative purposes.

FIG. 24 shows a cross section of the assembly of FIG. 22 in the planes alpha and beta shown in FIG. 23.

FIG. 34 to FIG. 42 illustrate a fourth illustrative embodiment of an assembly and a filament feed system, as proposed by the present disclosure.

FIG. 34 shows an arrangement of three rotatable components comprising a plurality of ridges (or protruding parts) in the form of rings. The axes of the rotatable components are not parallel to the channel, but are at a small angle.

FIG. 35 shows, by means of an unfolding, how the rings of the rotatable components can be set up (with an axial shift) so that they run in the same grooves of the filament. This can also be regarded as a timeline, which clearly shows that the points of engagement with the filament shift in axial direction of the filament over time.

FIG. 36 and FIG. 37 show examples of how rotatable components with rings arranged as in FIGS. 34 and 35 engage the filament, and form one or more spirals or helices on the filament, thereby advancing the filament.

FIG. 39 shows the filament drive system of FIG. 38A with synchronous drive.

FIG. 40 shows in perspective view a filament drive system having two assemblies according to the fourth embodiment, driven in the opposite direction. (the drive wheel of the upper assembly is driven clockwise with respect to the rest of the assembly, while the drive wheel of the lower assembly is driven anticlockwise with respect to the rest of the assembly, or vice versa).

FIG. 41 shows a cross section of the filament drive system of FIG. 40.

FIG. 42 is a front view of the filament drive system of FIG. 40. It clearly indicates that the axes of the rotatable components slope in a different direction. The two assemblies are synchronized by being driven by a single motor.

DETAILED DESCRIPTION

Various illustrative embodiments will now be described, which the person having ordinary skill in the art should understand are not intended to be limiting to the disclosure as a whole or to its appended claims.

In the present disclosure, the terms 'rolls' and 'rotatable components' are used as synonyms.

Figure 6:
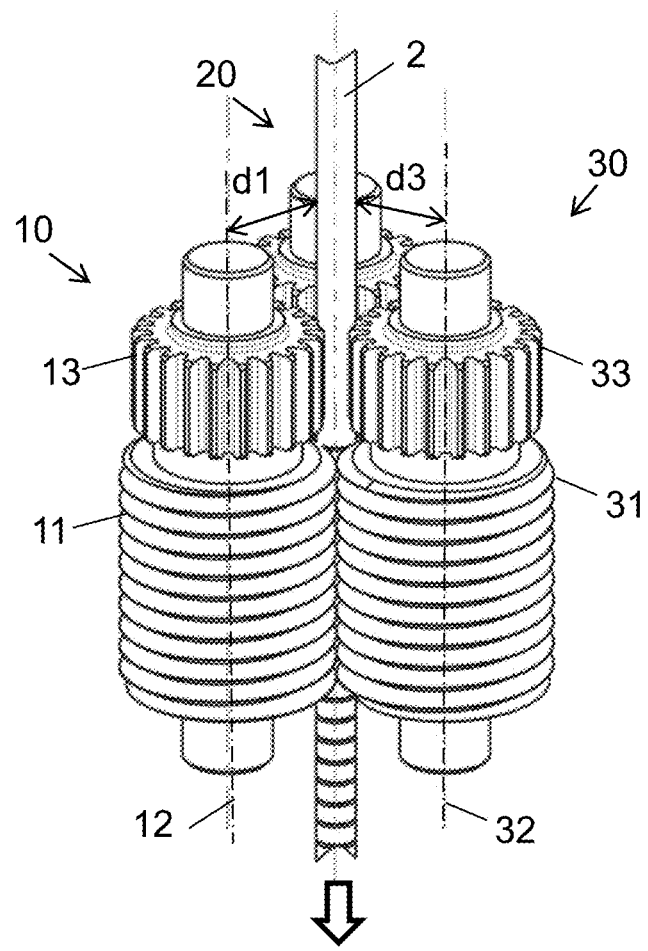
Figure 22:
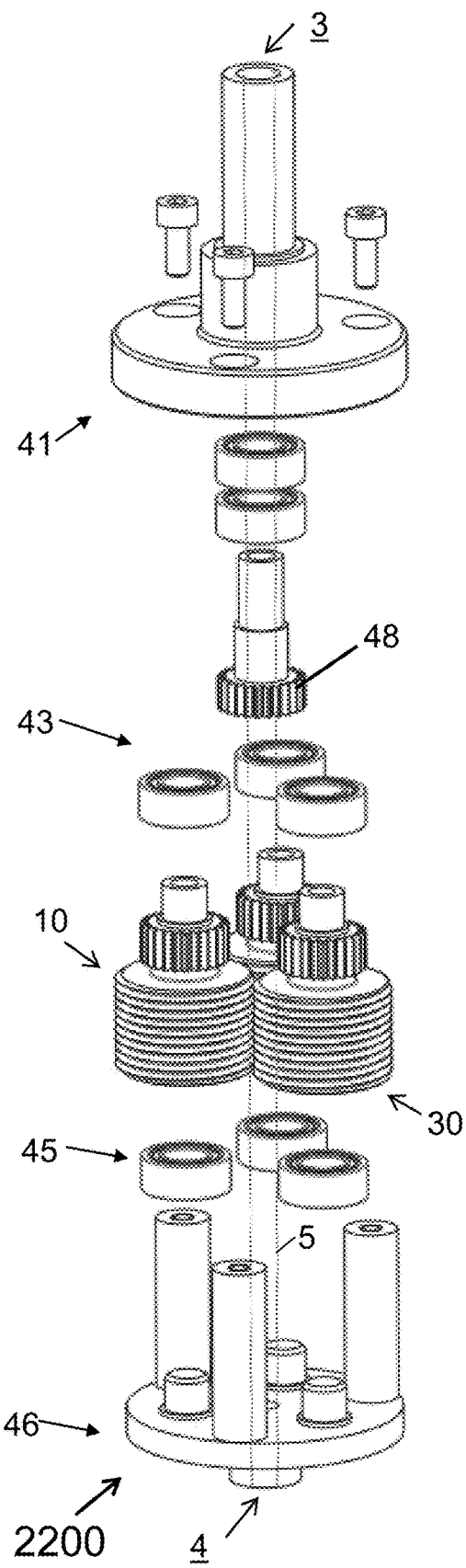
Figure 32:
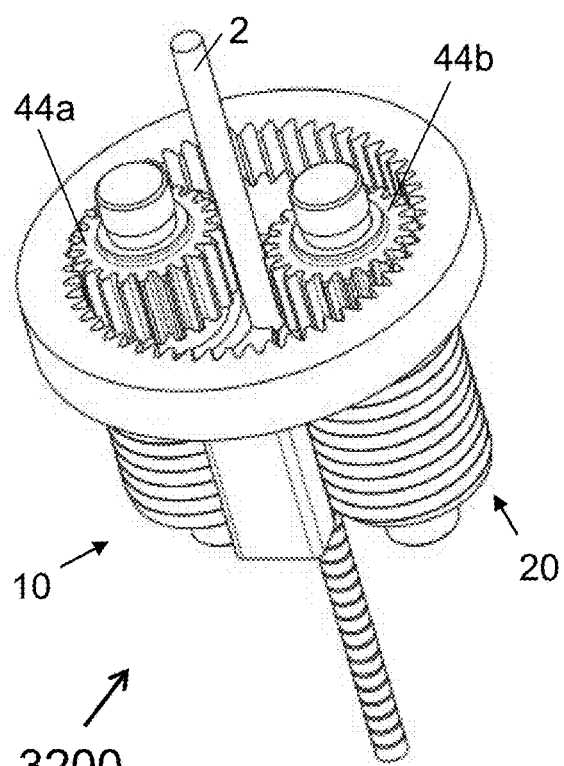
FIG. 32 and FIG. 33 illustrate a third illustrative embodiment of (a portion of) an assembly according to the present disclosure, as a variant of the first embodiment. It contains only two rotatable components with screw thread, but two additional holders or mechanical guides.
Figure 34:
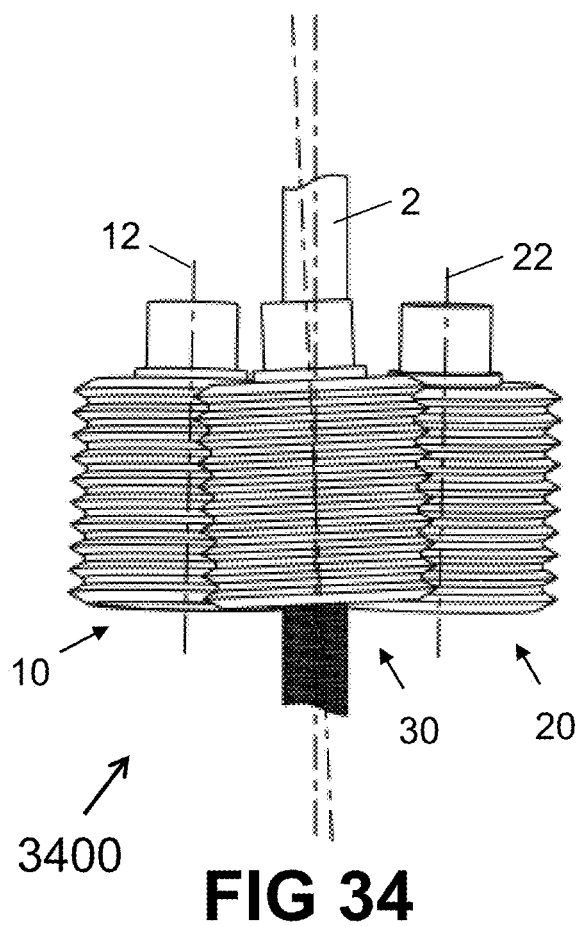

In this document, the term 'filament engagement mechanism' or, in short, 'engagement mechanism' is used to refer to an arrangement of at least two or at least three rotatable components arranged around a cylindrical channel, as shown, for example, in FIG. 6 (first embodiment) or FIG. 22 (second embodiment) or FIG. 32 (third embodiment) or FIG. 34 (fourth embodiment).

In this document, the terms 'pinch rollers', 'grip rollers' and 'pressure rollers' are used as synonyms.

The present disclosure is related to a feed mechanism of a filament, more in particular a thermoplastic filament, or a filament comprising a metal and/or ceramic powder and a thermoplastic binder. While the feed mechanism was initially designed for a filament consisting only or consisting mainly of a thermoplastic material, it was surprisingly found that this feed mechanism also works extremely well for a filament comprising a metal and/or ceramic powder particles and a thermoplastic binder, as will become clear further.

Figure 1:
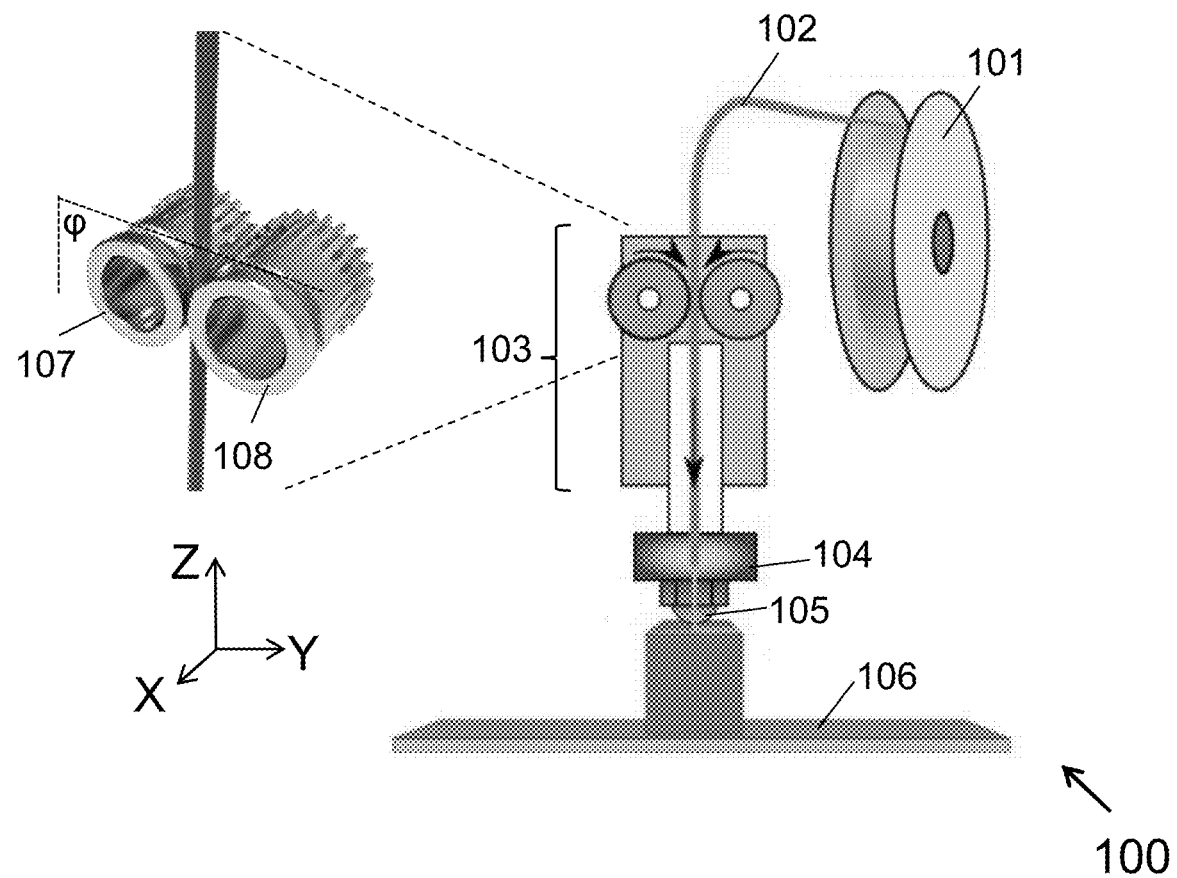
FIG. 1 shows a schematic block diagram of a known extrusion-based system. It comprises a feed mechanism based on two pinch rollers or gripping rollers.

FIG. 1 shows a schematic block diagram of a known extrusion-based system. It contains a feed mechanism based on two pressure rollers or pinch rollers (a so-called 'pinch roller system' or 'pinch feeder system') 107, 108. The operating principle of the system 100 of FIG. 1 has already been discussed in the background section.

Figure 2A:
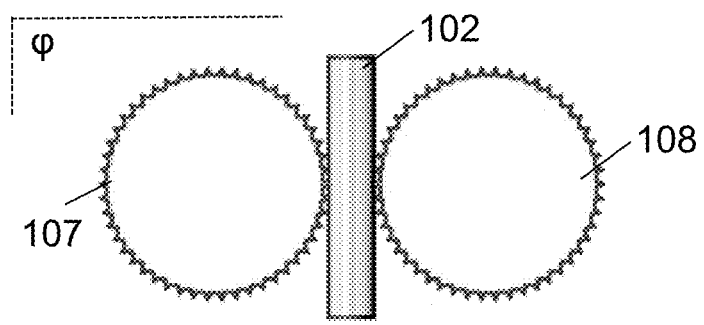
FIGS. 2A and 2B shows a problem that can occur with the system of FIG. 1 under particular circumstances.
Figure 2B:
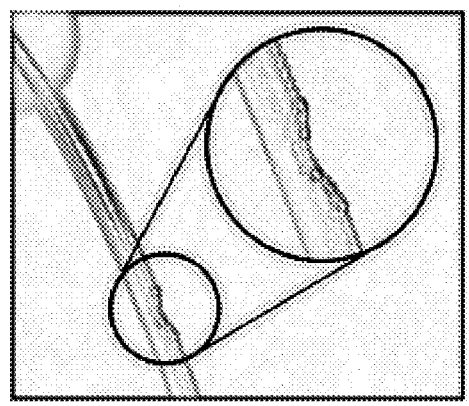

FIG. 2 shows a problem that can occur with the system of FIG. 1 under particular circumstances, e.g., when the pinch rollers want to propel the filament 102, but instead, scrape material off of the filament.

Figure 47:
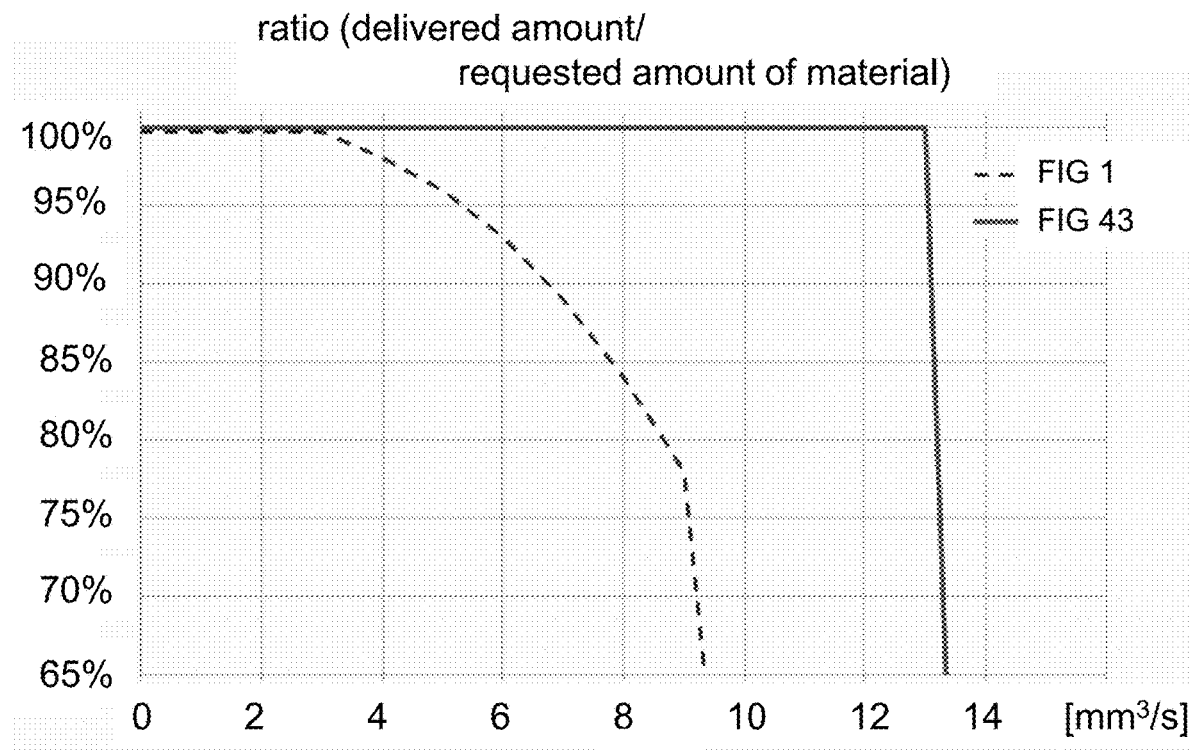
FIG. 47 shows a graph showing the ratio of the amount of material delivered to the requested amount of material, based on data measured with the test rig of FIG. 43 and a thermoplastic filament.
Figure 48:
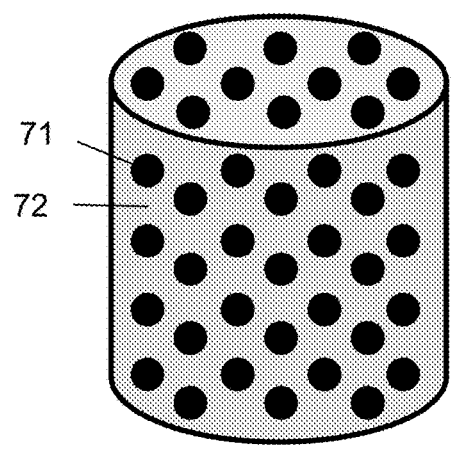
FIG. 48 is a schematic representation of a filament comprising metal and/or ceramic powder particles and a thermoplastic binder, as can be used in embodiments disclosed herein.
Figure 49:
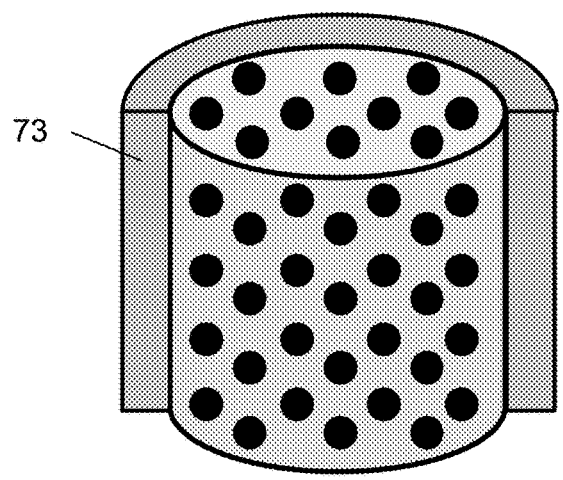
FIG. 49 is a schematic representation of a filament similar to that of FIG. 48, but surrounded by an additional thermoplastic layer.
Figure 50:
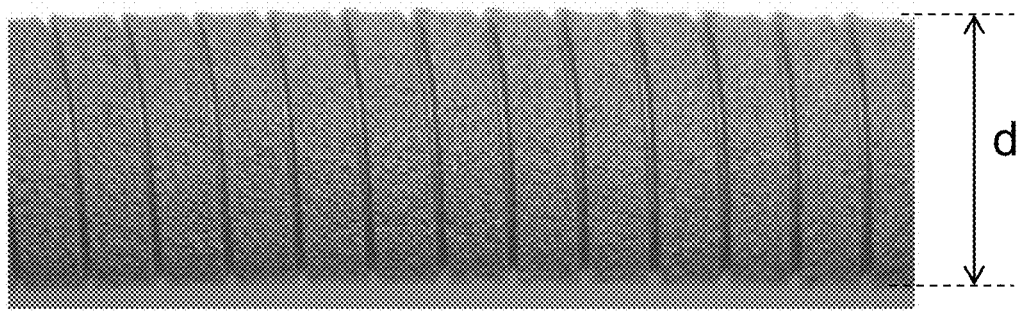
FIG. 50 is a picture showing an enlarged view of a portion of a filament comprising a stainless steel powder and a thermoplastic binder, after being fed through a feeder system described above.
Figure 51:
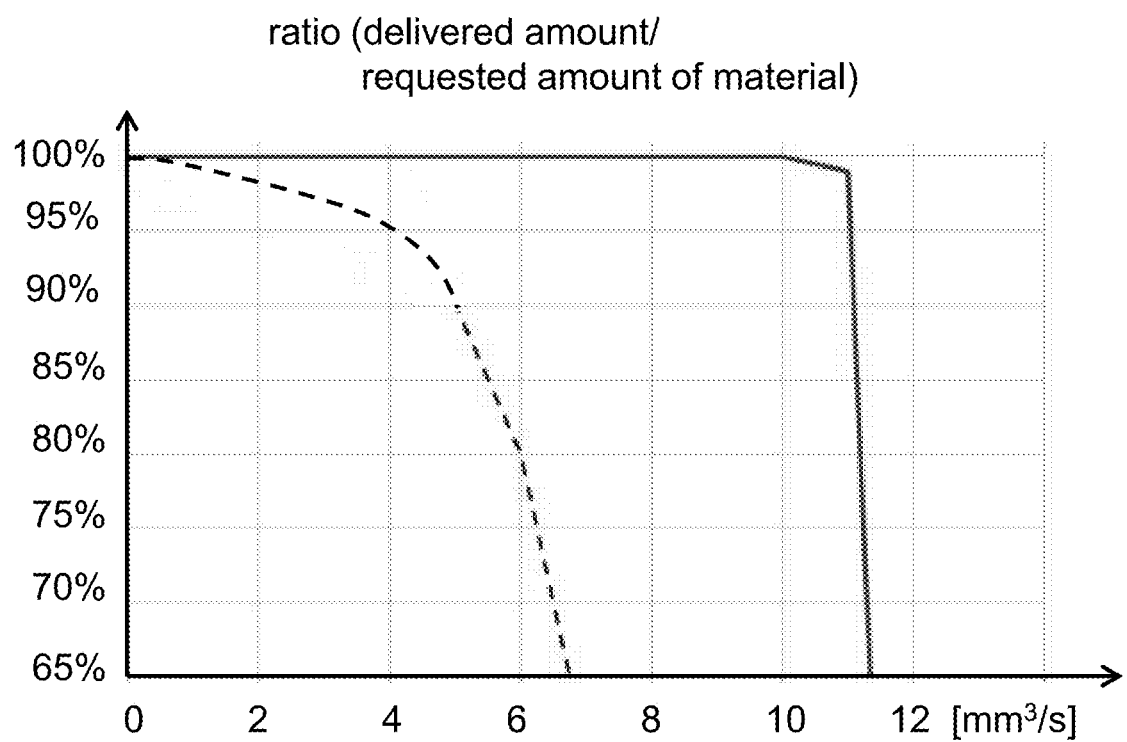
FIG. 51 shows a graph similar to that of FIG. 47, showing the ratio of the amount of material delivered to the requested amount of material, based on data measured with the test rig of FIG. 43 and the filament of FIG. 50, comprising a powder of stainless steel and a thermoplastic binder.

The dotted curve of FIG. 47 shows a typical curve of such a feed system when feeding a thermoplastic filament. The X-axis shows the requested amount of material (e.g. the set amount of material to be deposited, as requested by an external computer (not shown)). The Y axis shows the ratio of the amount of material supplied (exit flow rate) to the amount of material requested (requested flow rate). As can be seen, this ratio (with the necessary corrections and compensations) is substantially 100% for relatively low flow rates (in the example lower than about 3 mm$^3$/s), but at higher flow rates the ratio decreases, for example because slip occurs, for example because the heating element 104 with nozzle 105 cannot follow sufficiently, and exert an upward pressure force on the filament 102. As shown, the deviation depends on the speed. The pinch rollers 107, 108 can follow to a certain value (in the example to the force that occurs at 3 mm$^3$/s), but from a certain value 'slip' occurs, and the teeth of the pinch rollers start scraping material away from the filament 102 to a greater or lesser extent. As a result, the amount of material supplied will be less than the requested amount of material, which is of course detrimental to the quality and finishing of the workpiece to be produced. In practice, this means that the maximum extrusion rate of the feed system shown in FIG. 1 with the curve of FIG. 47 is limited to a maximum of about 3 mm$^3$/sec for optimum quality, and to about 5 mm$^3$/sec for a deviation of 5%. For higher rates, the quality of the product produced decreases very rapidly.

Figure 3:
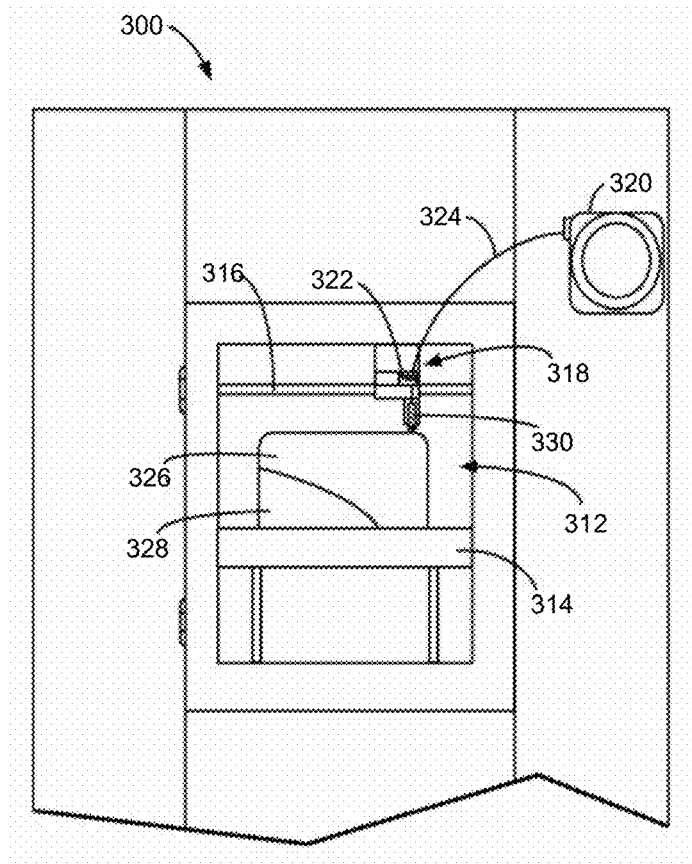
FIG. 3 to FIG. 5 illustrate another known extrusion-based system.
Figure 4:
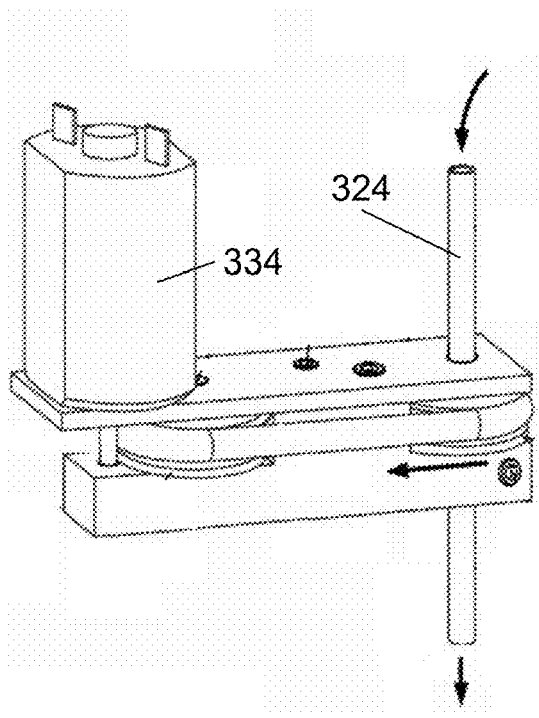
Figure 5:
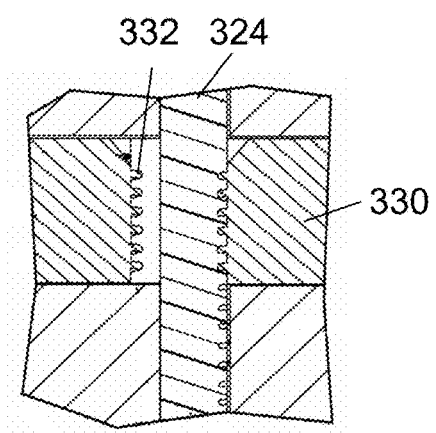

FIG. 3 to FIG. 5 illustrate another known extrusion-based system. FIG. 3, FIG. 4 and FIG. 5 as presented herein is a replica of FIG. 1, FIG. 11, and FIG. 4 of U.S. Pat. No. 7,896,209B2, respectively.

The system of FIG. 3 has already been discussed in the background section.

FIG. 4 shows that the system 300 includes a drive mechanism with a motor 334, which drives a rotatable component 330 with internal screw thread via a belt.

FIG. 5 shows how the internal screw thread 332 of the rotatable component 330 engages the filament 324, thereby advancing the filament.

Further investigation has shown that this system has several disadvantages. For example, among other things, there is high friction between the rotatable component 330 and the filament 324, because the screw thread cuts into the filament like a knife, and is pulled through it, as a result of which the filament 324 heats up and can melt locally even before it has arrived in the heating unit. This requires a fairly strong motor, the molten material may clog up parts of the feed system, the amount of material supplied is less well defined, and when the system is stopped, the molten material will cure, which may cause the rotatable component to get stuck.

The inventors propose a completely different solution, namely a solution based on rotatable components with external ridges (e.g. external screw thread or with rings or discs), the rotatable components and the ridges being dimensioned and mounted in such a way that the external ridges penetrate to some extent into the filament, but apart from these ridges, that the rotatable components mainly roll over the surface of the filament.

More specifically, the inventors propose an assembly, for use in an extrusion-based production system, the assembly comprising the following:

an entrance for receiving a filament to be extruded;

an exit for delivering the filament, the entrance and exit defining a channel within which the filament will move;

at least two rotatable components comprising a first rotatable component and a second rotatable component;

wherein the channel is at least partially located between the first component and the second component;

wherein the first rotatable component is rotatable about a first axis and has first external ridges, said first axis being located at a first distance from the channel such that the first external ridges at least partially penetrate the channel;

wherein the second rotatable component is rotatable about a second axis different from the first axis and has second external ridges, said second axis being located at a second distance from the channel such that the second external ridges at least partially penetrate the channel;

wherein the first and second rotatable components are mounted such that, when a filament is inserted into the channel and when the assembly is rotated relative to the filament, the first rotatable component rotates about its axis (the first axis), and the second rotatable component rotates about its axis (the second axis), and the first and second axes move about the filament in such a manner that the first and second rotatable components mainly roll over a surface of the filament, and that the first and second external ridges penetrate at least 0.05 mm into the filament thereby forming at least one groove in the filament, and axially displacing the filament.

Such an assembly can be used to form a filament feed system, or a complete extrusion-based production system, e.g. in a so-called 3D printer.

Various embodiments based on these principles are possible. Four embodiments will be discussed in more detail below, which the person having ordinary skill in the art should recognize are not intended to be limiting to the disclosure as a whole or to its appended claims.

First Embodiment

FIG. 6 to FIG. 12 and FIG. 14 to FIG. 19 show the main aspects of a first illustrative filament feed system 900.

FIG. 6 shows an arrangement of three rotatable components 10, 20, 30 with respective axes 12, 22 and 32, and with respective external screw threads 11, 21, 31 in engagement with the filament 2. In a variant, the assembly may for instance comprise four or five or six rotatable components.

The external screw thread partially penetrates the filament, which usually comprises a thermoplastic material. As a result, there is a good grip on the filament, and the risk of unintended axial slip is minimal.

In contrast to the system of FIG. 5, where the screw thread penetrates into the filament at only one position (right side in FIG. 5), the filament is penetrated at least two or at least three different positions in the system of the present disclosure.

The main advantage, however, is due to the displacement of the axes relative to the filament. Where the axis of the rotatable component in the system of FIG. 5 has a fixed position, the axes of the system of the present disclosure move over an imaginary cylinder surface. The main effect of this is that the friction between the rotatable components on the one hand, and the filament on the other hand is mainly a 'rolling friction', comparable to a wheel that rolls over a road surface. This offers several advantages. For example, a less powerful engine is required (which translates into a lower cost), and the filament is heated (much) less, reducing the risk of the filament melting, clogging of the feed mechanism, and the engine jamming.

During operation, the filament 2 will move axially in the space between the rotatable components in the direction of the arrow. (see also FIG. 15).

Figure 7:
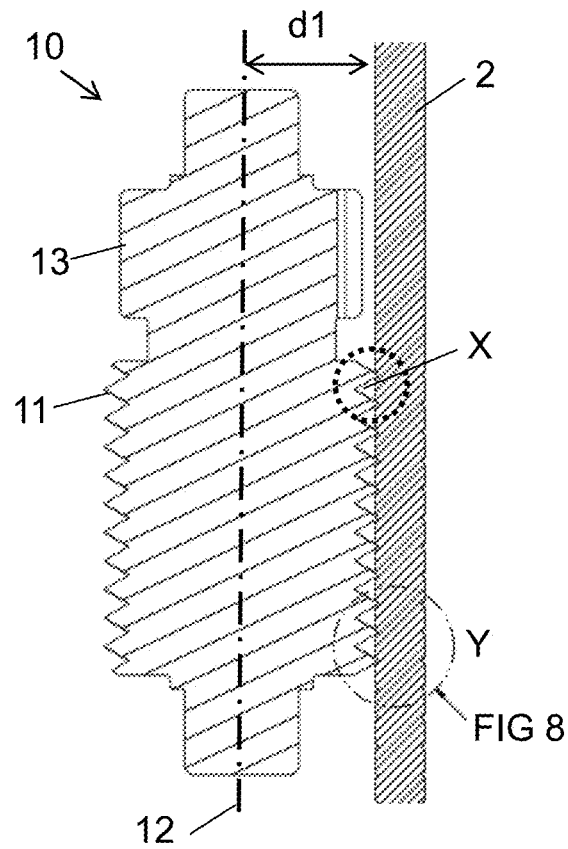

FIG. 7 is a sectional view of the first rotatable component 10 with screw thread 11, and shows how the ends of the screw thread 11 engage in the filament 2. The same naturally also occurs for the other rotatable components 20, 30.

Figure 8:
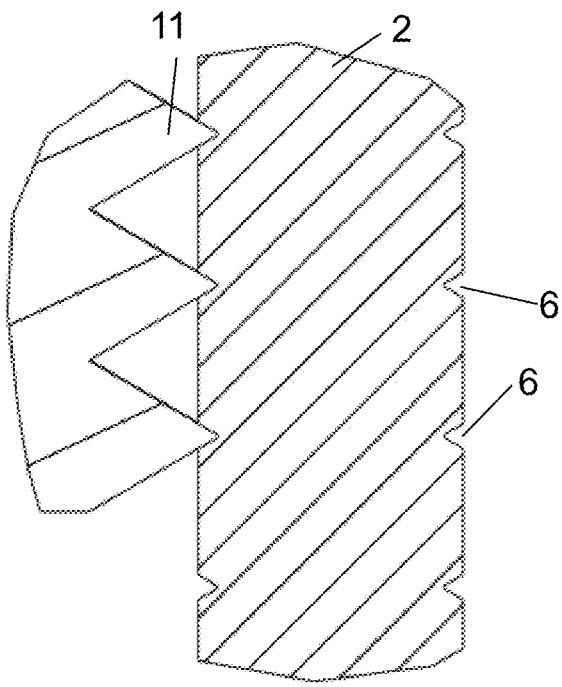

FIG. 8 is an enlargement of a portion of FIG. 7.

It is noted that in FIG. 7 and FIG. 8 only one type of external screw thread 11 is shown, namely with an isosceles triangular cross-section, but of course the disclosure is not limited thereto, and other suitable cross-sections can also be used, e.g. screw thread with a scalene triangle, or screw thread with a pointed end but curved flanks, or screw thread with an end having a circular cross-section, or screw thread with a trapezoidal cross-section, etc.

It is important that the radial end of the screw thread can partially penetrate and thus engage with the filament. This can be achieved by placing the rotatable components at a suitable distance from the filament. In practice, a plastic deformation will occur as a result of the pressure of the ridges against the filament, as a result of which the filament will get permanent recesses or grooves 6 or notches. It has been found that these notches surprisingly form individual rings, e.g. circular rings, and therefore not a helix shape.

Although not shown in FIG. 7 and FIG. 8, the screw thread may also be slightly conical, e.g. in a manner in which the screw thread does not or hardly penetrates into the filament 2 near the entrance of the feed mechanism (e.g. near position X in FIG. 7) so that the filament can easily be positioned between the components, and gradually penetrates deeper near the exit of the feed mechanism (e.g., near position Y in FIG. 7), so that there is a very good grip between the rotatable components and the filament 2, so that the risk of accidental shifting ('slip') is reduced, or is minimal.

Figure 9:
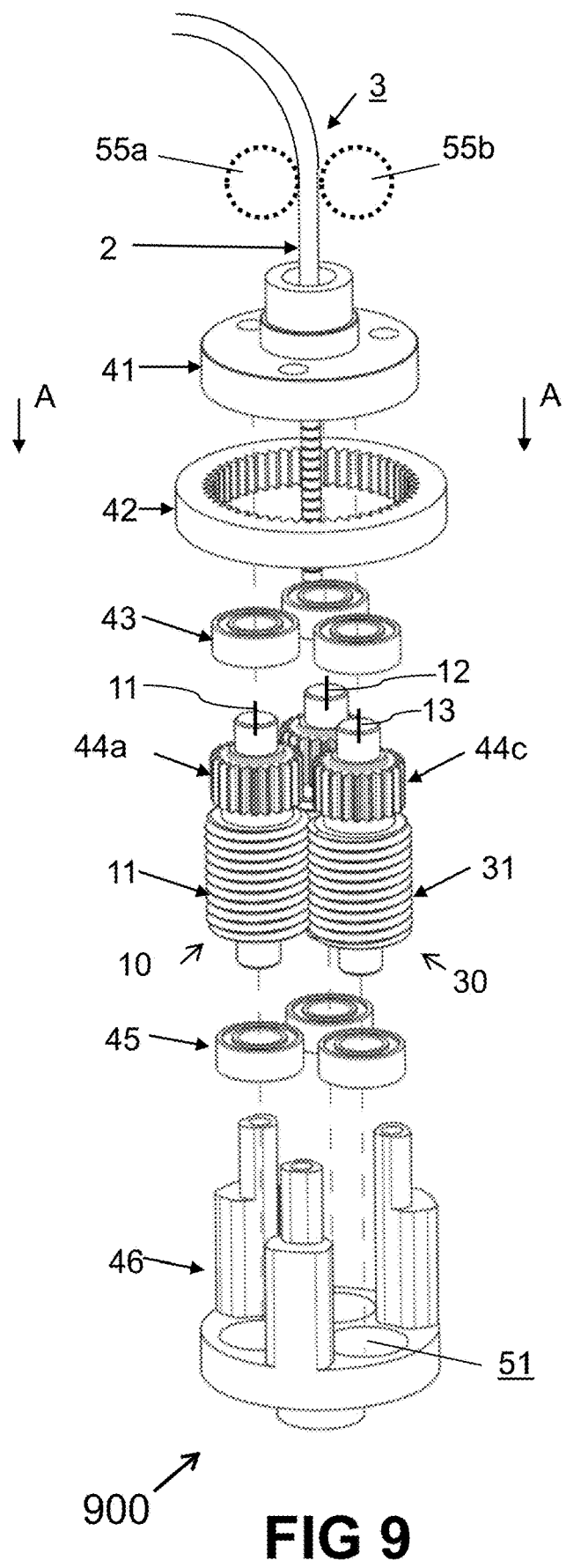

FIG. 9 shows an exploded view of the three rotatable components of FIG. 6 and an assembly comprising these three rotatable components 10, 20, 30. The components 10, 20, 30 are mounted at the top and bottom by means of bearings 43, 45, e.g. ball bearings. These bearings, in turn, are mounted in corresponding recesses 51 in a lower portion 46 and upper portion 41 of a carrier structure. The upper portion 41 can for instance be attached to the lower portion 46 by means of bolts.

The components 10, 20, 30 further each include at the top (or at the bottom) a gearwheel 44 that engages an internally toothed gearwheel, further referred to herein as a 'ring gear' or 'gearwheel' 42. The gearwheels 44 move in a similar manner to the ring gear 42 as is the case with known planetary gearwheel transmissions (as shown, for example, in FIG. 13), where gearwheel 1301 can rotate freely about its axis, and the sun gear 1302 is omitted.

The assembly 900 can be rotated in different ways relative to the filament: e.g. (i) by rotating the upper portion 41 of the carrier structure relative to grip rollers 55, or e.g. (ii) by rotating the lower portion 46 of the carrier structure relative to grip rollers 55, or e.g. (iii) by rotating the ring gear 42 relative to the grip rollers. As shown (in dotted line), the filament 2 is clamped sideways between pinch rollers or grip rollers or pressure rollers 55, to prevent or limit torsion of the filament.

Figure 44:
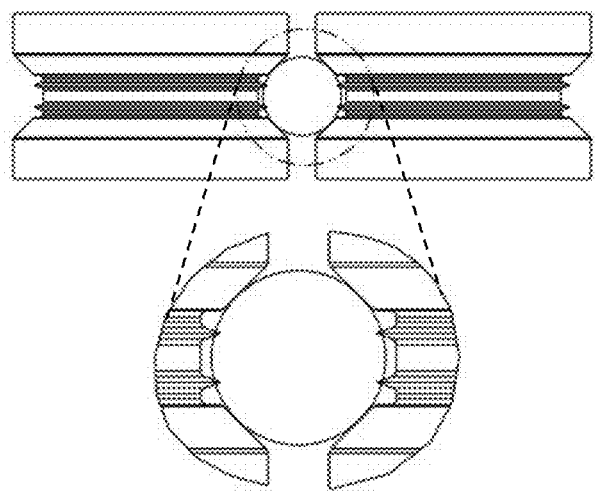
FIG. 44 to FIG. 46 shows a top view of some illustrative pressure rollers or pinch rollers such as may be used in embodiments according to the present disclosure.
Figure 45:
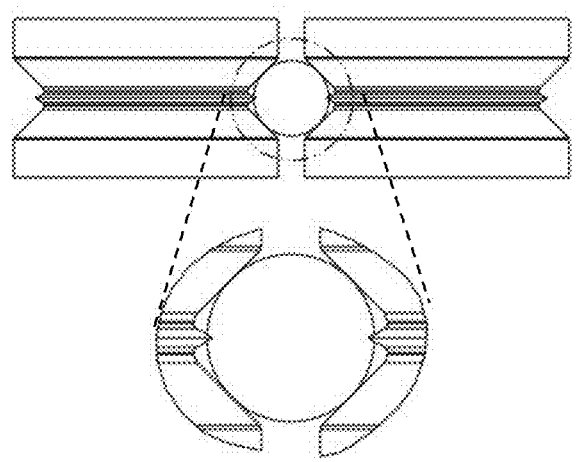
Figure 46:
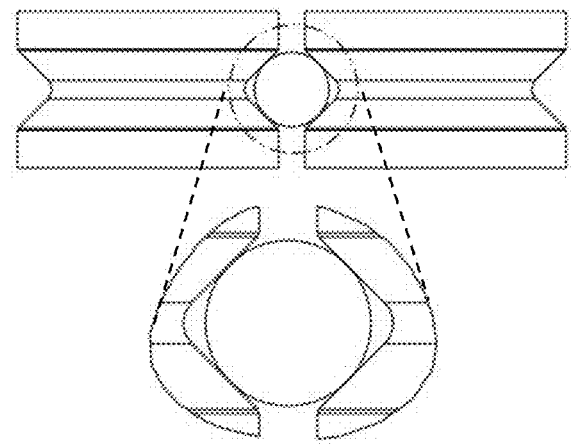

The grip rollers 55 ensure that the filament cannot be twisted limitlessly as a result of the engagement of the screw threads of the rotatable components. The grip rollers 55 counteract torsion of the filament about its longitudinal axis, but allow linear displacement of the filament in the longitudinal direction. Although not the main focus of the present disclosure, the pinch rollers 55 may optionally have additional features to counteract such torsion, e.g., as shown in FIG. 44 to FIG. 46.

In contrast to the system 100 of FIG. 1, in embodiments of the present disclosure, the pinch rollers are not driven, and they do not determine the throughput speed. When the filament comes from a filament spool (as is usually the case), and when the filament is guided under an arc to the entrance, the arc shape helps to limit torsion of the filament.

Figure 10:
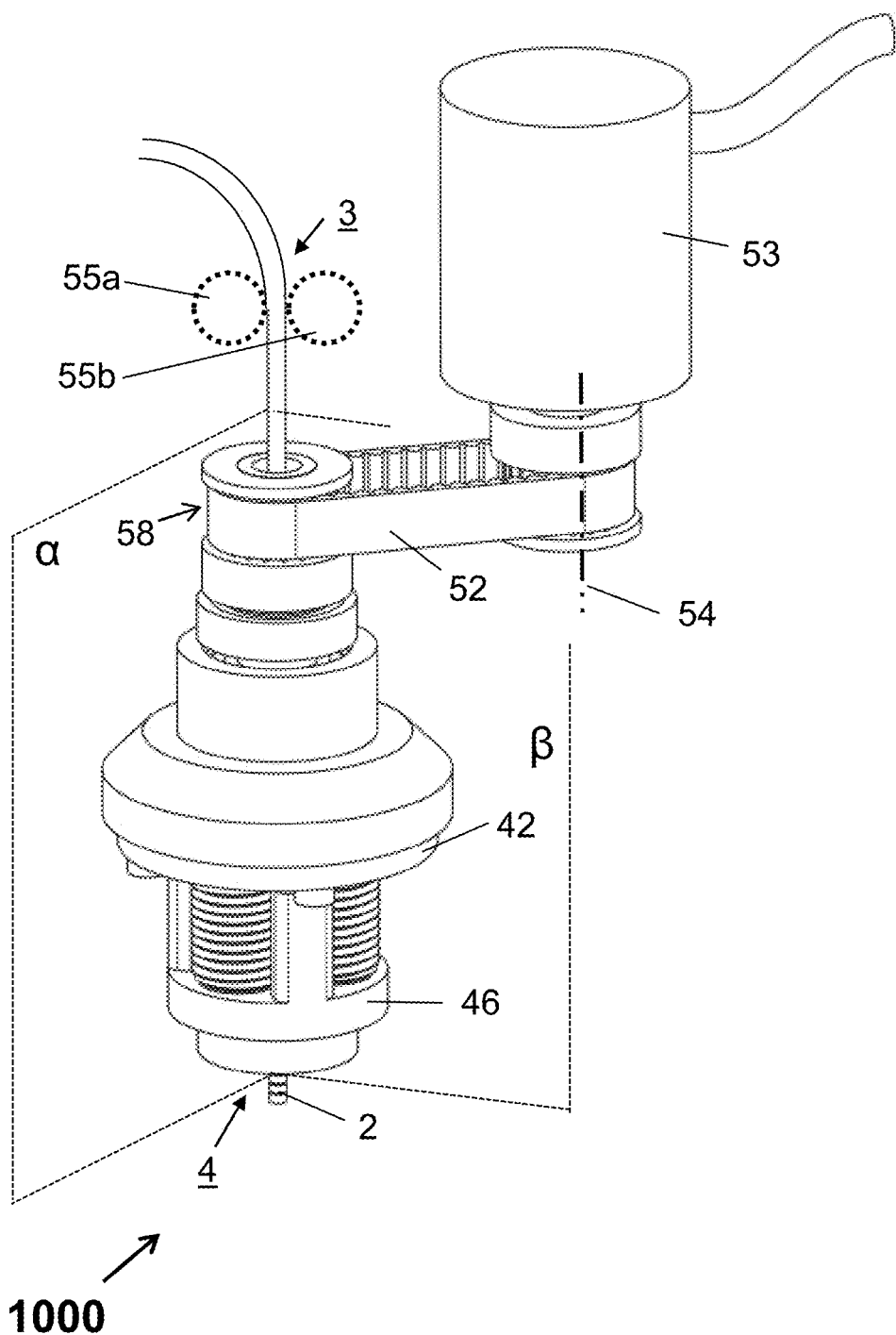

FIG. 10 shows (left) an assembly based on the components of FIG. 9, in assembled form. Together with the motor 53, e.g. a stepper motor, and the toothed belt 52 and the grip rollers 55, the whole forms a filament feed system. In alternative embodiments, the toothed belt 52 may also be replaced with a chain drive or gearwheel drive or the like.

Figure 11:
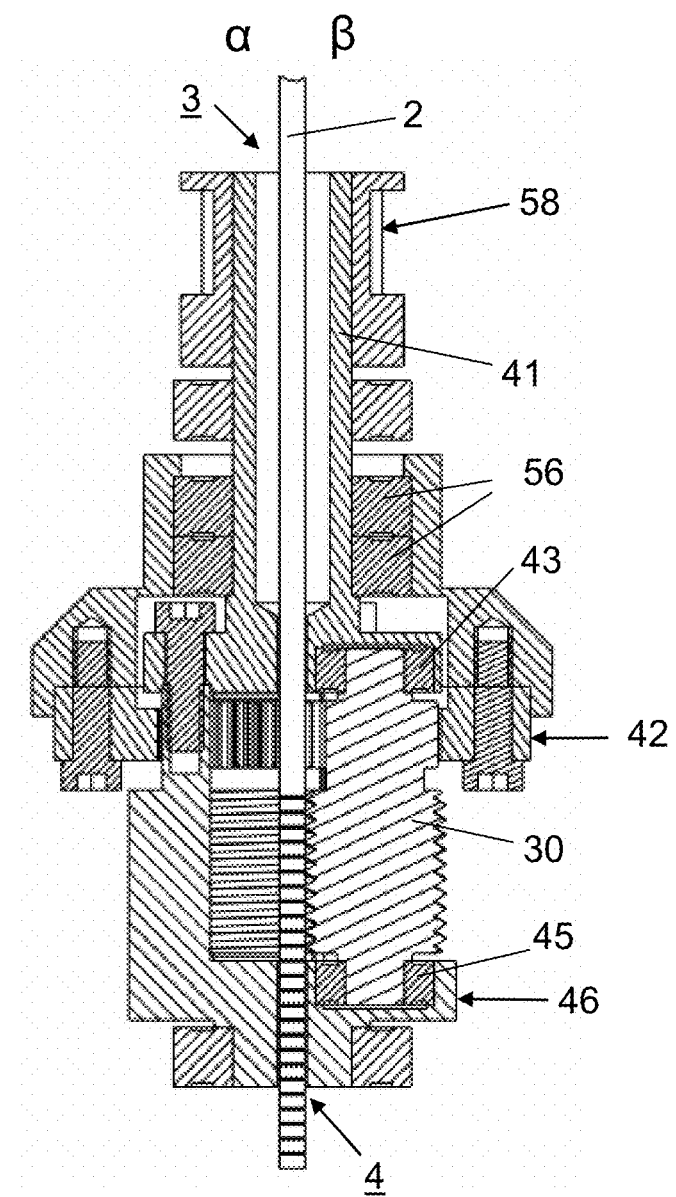
Figure 24:
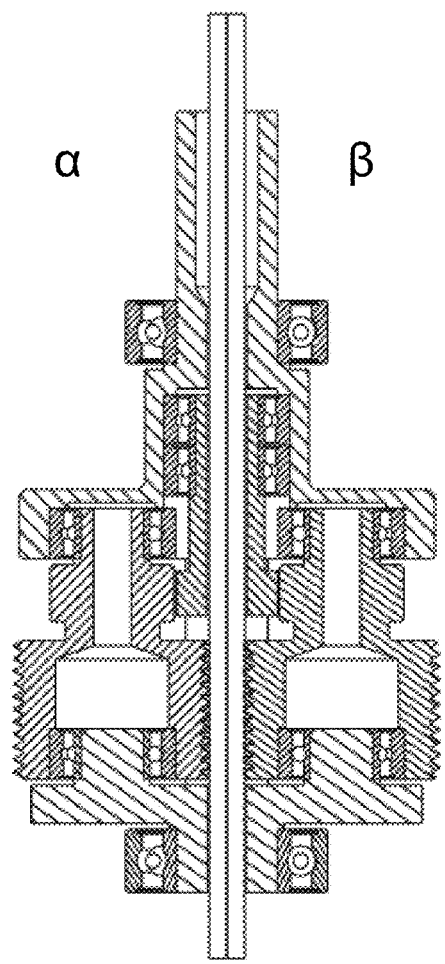

FIG. 11 shows a cross-sectional view of the assembly of FIG. 10. Herein it is clearly visible how the axis of the rotatable component 30 is mounted in bearing 43 and bearing 45. In this example, the axis of the rotatable component projects beyond the cylindrical body with the screw thread. Alternatively, it is also possible, if the diameter of the rotatable component is sufficiently large, to incorporate the bearing into the cylindrical body, as shown in FIG. 24.

In the example of FIG. 10 and FIG. 11, the ring gear 42 is rotatably arranged with respect to the carrier structure 46, 41 by means of one or more bearings (e.g. sliding bearing or ball bearing). A person skilled in the art familiar with planetary gears will understand that, in the presence of the filament 2, rotation of the upper portion 41 relative to the carrier structure will cause rotation of the three components 10, 20, 30 around their respective axes 12, 22, 32, as well as a displacement of these axes about a virtual cylinder circumference around the central channel 5 or around the filament 2, but also that the ring gear 42 rotates around its own axis at a speed different from the rotational speed of the carrier structure 41, 46. For professionals not familiar with planetary gears, this is much harder to understand.

Even so, the aforementioned mainly 'rolling motion' of the rotatable components 10, 20, 30 over the circumference of the filament 2 is obtained in this way. By appropriate dimensioning, e.g. choice of dimensions (e.g. a suitable outer diameter of the rotatable element) and suitable positions (e.g. with an equal angular distance of 120°, and a distance 'd1' from the channel 5 which ensures that the screw thread penetrates the filament to a desired depth, e.g. from about 0.05 mm to about 0.25 mm, e.g. about 0.06 mm, or about 0.08 mm, or about 0.10 mm, or about 0.11 mm, or about 0.12 mm, or about 0.13 mm or about 0.14 mm, or about 0.15 mm, or about 0.18 mm or about 0.20 mm, or about 0.22 mm), the filament 2 is clamped radially with an appropriate tension between the rotatable components 10, 20, 30. This tension must be sufficiently large for the screw thread to penetrate at least partially into the filament, e.g. as shown in FIG. 8.

The part that is driven, in the example of FIG. 10, timing-belt pulley 58, may be provided with an external serration or grooves for engagement of a toothed belt 52 (see FIG. 10). In this way the risk of slip between motor shaft 54 of motor 53 (e.g. a stepper motor) and the driven component is greatly reduced, or even completely eliminated.

In alternative embodiments, another synchronous drive may also be used, such as, for example, a chain drive, or a reduction gear or a gear box or the like.

Figure 12:
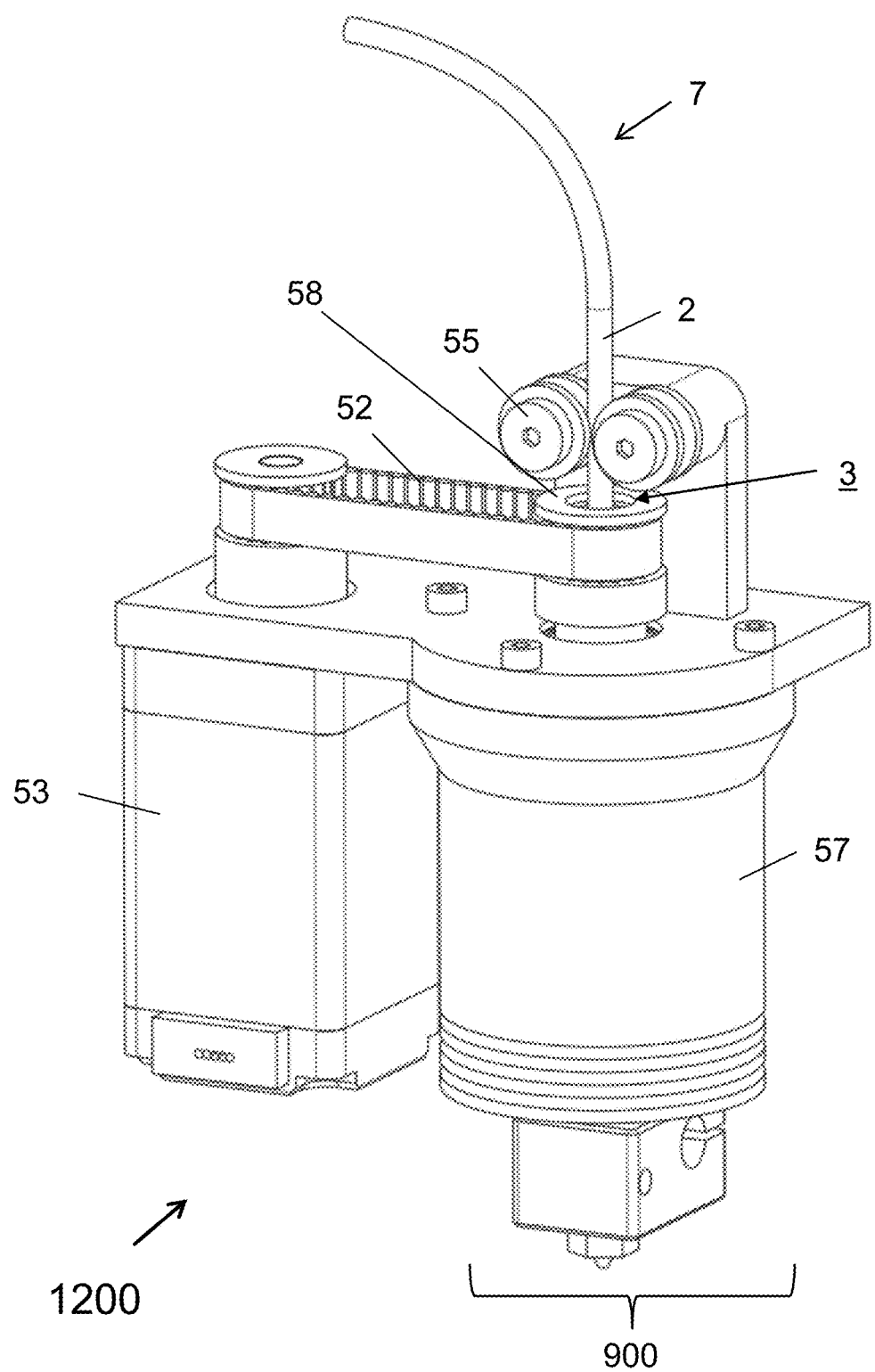

FIG. 12 shows an example of a filament feed system 1200 that comprises a motor 53 and an assembly 900 as described above, built into a housing 57.

In the example, the filament 2 is fed over a bent curve and stretched between two pinch rollers 55 to the entrance 3. As a result, torsion of the filament is substantially avoided or largely restricted. In the example, timing-belt pulley 58 is driven by a toothed belt 52. By means of the drive mechanism 53, 52 and the internal gear mechanism 42, 44, the three rotatable components 10, 20, 30 mainly roll over the surface of the filament, but because the screw threads 11, 21, 31 of the rotatable components penetrate slightly into the filament, a certain moment of force is nevertheless exerted on the filament, as a result of which the filament will twist slightly (estimated to be less than 45°), but this has no noticeable influence on the axial offset of the filament 2 and thus on the throughput speed of the filament.

As will become clearer with reference to FIG. 16 to FIG. 19, it is a great advantage of this drive mechanism that the rotatable components 10, 20, 30 have to make a relatively large displacement for only a small axial displacement 55 (see FIG. 18) of the filament 2.

Figure 33:
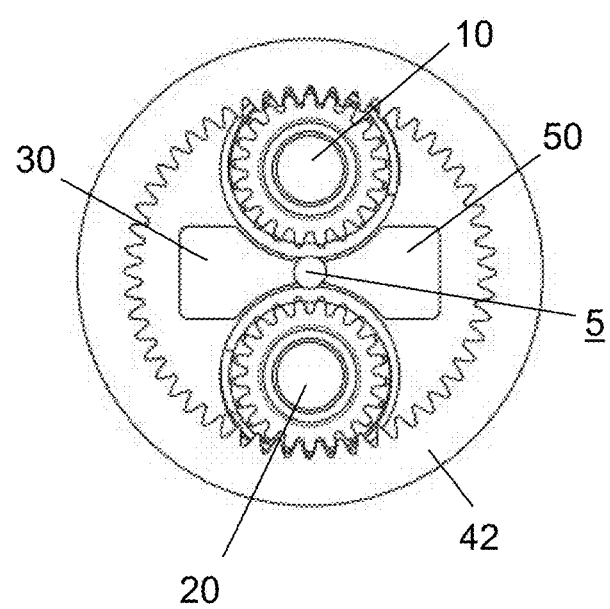

Indeed, to move the filament 2 over the distance 55, the axis 12 has to rotate a number N of times around the filament. This number N is approximately equal to d_roll/d_filament, where d_roll is the outer diameter of the rotatable component, and where d_filament is the outer diameter of the filament. In the prototype of FIG. 33, this value is approximately equal to 6.4. After this, the rotatable component was rotated about 1.0 times around its own axis.

This large angular displacement (in the example: 6.4 revolutions) contributes to the high accuracy and high transmission ratio of the filament feed system, which is favorable for the motor selection. The feed mechanism actually acts as a built-in reduction gear, whereby an external gear transmission can be avoided, resulting in a reduced cost and reduced weight.

Referring back to FIG. 12. Another major advantage is that the motor 53 can run at a relatively high speed, and only needs to supply a small torque (e.g., less than 0.13 Nm, e.g., less than 0.10 Nm, e.g. less than 0.08 Nm, e.g. less than 0.05 Nm, e.g. less than 0.02 Nm). This is extremely beneficial for relatively small motors, both stepper motors and brushless DC motors as well as brushless AC motors.

As is known, the power supplied (P) is equal to the product of the torque (T) and the speed (ω). For example, compared to the system described in U.S. Pat. No. 7,896,209B2, the required torque will be much lower due to rolling friction (in embodiments according to the present disclosure) versus dragging or abrasive friction and heating (in US'209B2). The net result is that a motor with a smaller power rating can be chosen, which is again favorable in terms of price and weight. The reduced weight of the feed mechanism in turn contributes to a higher accuracy and/or a higher speed of the total system, due to the lower inertia (e.g. less vibration).

Figure 13:
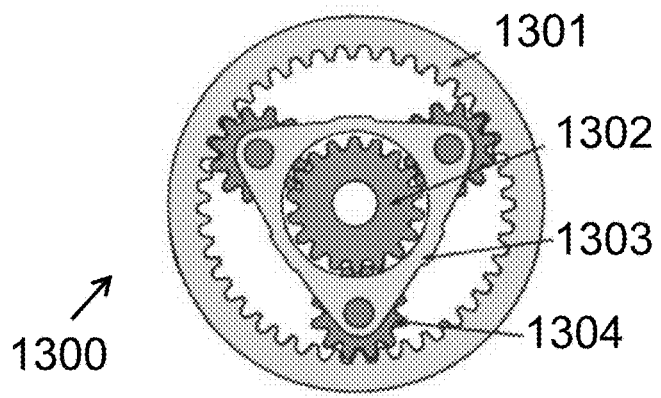
FIG. 13 shows an example of a planetary gear drive, known in the technical field of variable transmission systems.

FIG. 13 shows an example of a planetary gear drive, known in the technical field of variable transmission systems. The first and second embodiments of the present disclosure show similarities with this system.

In the example of FIG. 13, three gear wheels 1304 are rotated about their axis due to engagement of the gear wheels 1304 with a ring with internal teeth, herein referred to as 'ring gear', and the axes of the gear wheels 1304 will move across a virtual circle. The relative angular rotations of the three gear wheels 1304 are synchronised with each other, which is advantageous for having the screw threads run in the same track on the filament. The relative positions of the gear wheels 1304 is (in this example) determined by rotating the triangular component 1303, which is called 'carrier'.

Optionally, the planetary drive of FIG. 13 has both a central gear wheel 1302 and a ring gear 1301. In a simplified form, the central gearwheel 1302 can be omitted, and the ring gear 1301 ensures that the gearwheels 1304 (read: rotatable components) move synchronously. Alternatively, the ring gear 1301 can be omitted, and the central gear 1302 provides for the synchronous movement of the gearwheels 1304 (read: rotatable components).

Figure 14A:
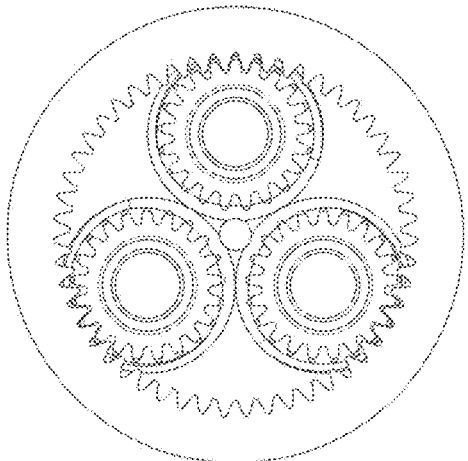
FIG. 14A shows a top view (direction A-A in FIG. 9) of the rotatable components and the filament.
Figure 14B:
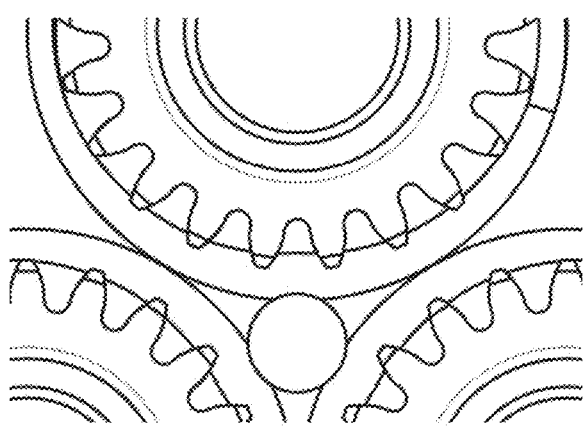
FIG. 14B shows an enlarged view of how the screw threads engage the filament.
Figure 16:
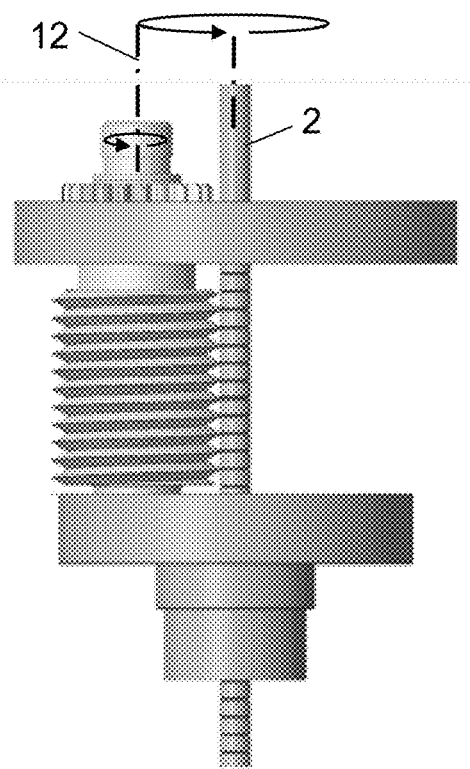
Figure 17:
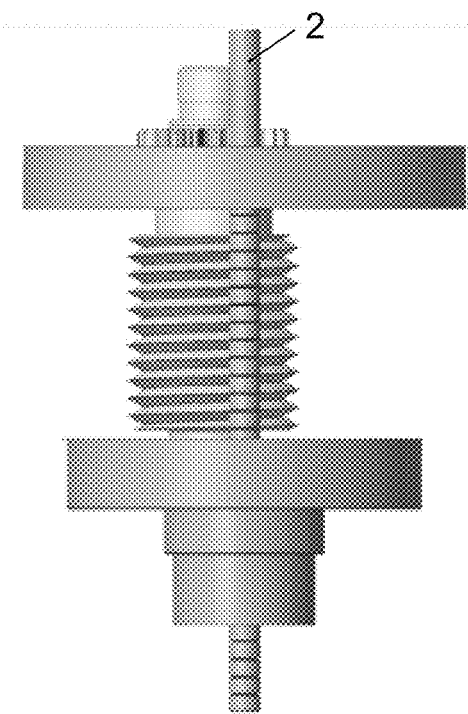
Figure 18:
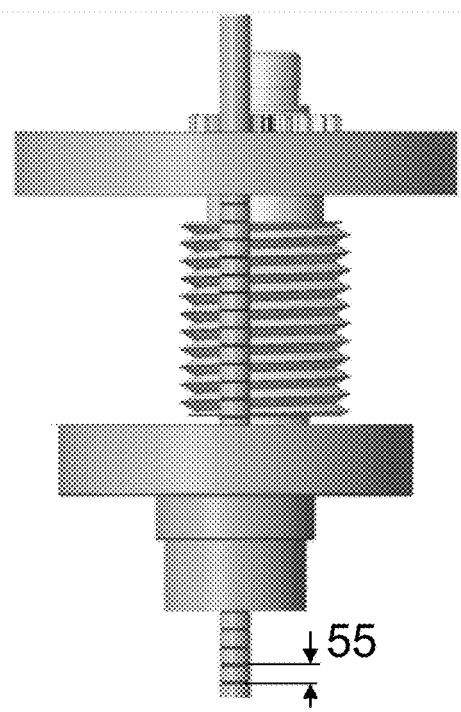
Figure 19:
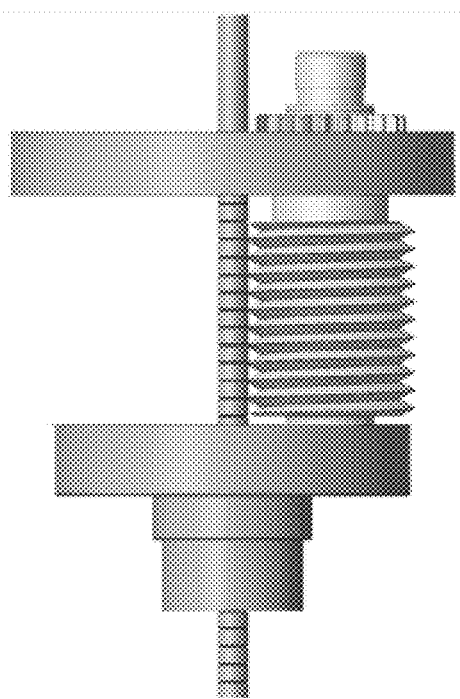

FIG. 14A and FIG. 14B illustrate how the three rotatable components 10, 20, 30 of FIG. 6 can be rotated and displaced relative to the filament 2.

Figure 15:
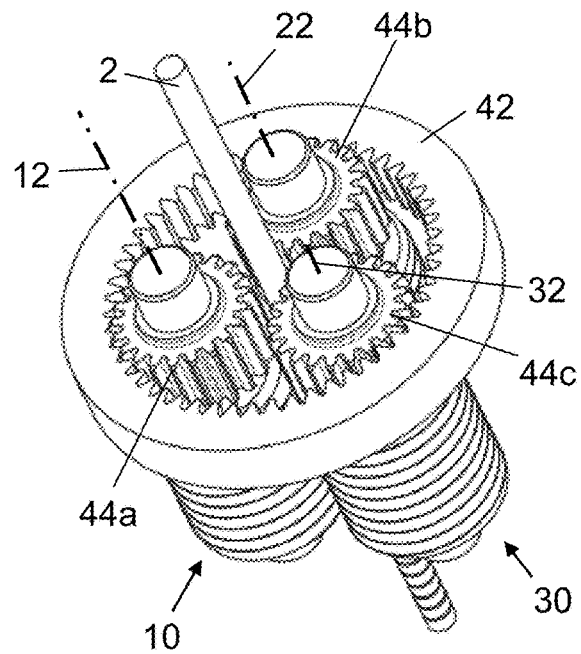

The gear wheels 44a, 44b, 44c of the rotatable components 10, 20, 30 of the filament feed mechanism of FIG. 15 perform a similar movement relative to the ring gear 42 as the gear wheels 1304 relative to the ring gear 1301 of the conventional planetary gear drive 1300 of FIG. 13, in the sense that the axes 12, 22, 32 of the gear wheels 44a, 44b, 44c move synchronously over a virtual circumference, and that these gear wheels 44a, 44b, 44c rotate synchronously about their respective axes 12, 22, 32.

FIG. 15 is a perspective view of FIG. 14A, from a different perspective than FIG. 6.

The ring gear 42 preferably has a number of teeth that is an integer multiple of the number of rotatable components (in the example of FIG. 15: three). This has the effect that the rotatable components can be easily 'mounted' with a mutual angular rotation of their screw threads of 360°/3=120°), according to their physical position.

In the case of four rotatable components (not shown), these rotatable components are preferably located at 90° around the filament, and their respective screw threads are also preferably rotated through 90°. This is simple when the number of teeth of the gear wheels 44 is a multiple of four.

In the specific example of FIG. 6 and FIG. 15, the number of teeth of the gear wheels 44 is equal to twenty-one (21), which is an integer multiple of 3, and the number of teeth of the ring gear is equal to fifty-one (51), also a multiple of 3.

FIG. 16 to FIG. 19 have already been discussed above.

Second Embodiment

FIG. 20 to FIG. 25 illustrate a second illustrative embodiment of an assembly, and a filament feed system that comprises such an assembly.

The second embodiment can be seen as a variant of the first embodiment, with as main similarities:

it also comprises three rotatable components with screw thread, that the movements of the three rotatable components are synchronized by means of gear wheels;

and with as main differences:

that ring gear 42 is omitted, and that a central gear wheel 48 with a central opening is added.

Everything described above for the first embodiment also applies to the second embodiment, mutatis mutandis.

The movements of the rotatable components 10, 20, 30 around their respective axes and around the filament 2 are identical as described for the first embodiment, with as greatest advantage that 'rolling friction' occurs, and virtually no 'sliding friction'.

The four gear wheels 44a-44c and 48 ensure that the movements of the rotatable components remain synchronised. This is important for the screw threads 11, 21, 31 of the rotatable components 10, 20, 30 to engage in the same grooves of the filament, or if one or more rolls are to form their own track, that the screw threads remain in their own track, and the different tracks maintain their mutual distance on the filament. Without synchronization of the rollers, the screw threads of the rollers may eventually run outside the grooves that have already been formed, as a result of which the grooves can be damaged, and the accuracy of the system can be greatly reduced.

Figure 20:
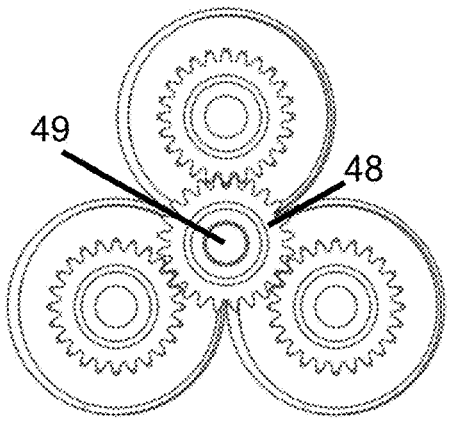
FIG. 20 to FIG. 24 show a second illustrative embodiment of a feed mechanism according to the present disclosure, as a variant of the first embodiment, without a ring gear but with a central gearwheel. The central gearwheel has an opening. This embodiment also has three rotatable components with external screw thread.

FIG. 20 is a top view of the three rotatable components 10, 20, 30 and the central gear wheel 48 with the central opening 49. This opening 49 has a diameter that is slightly larger than the outer diameter of the filament 2. This opening may, for example, have an inner diameter in the range of 2 to 8 mm, or 3 to 5 mm, so that the filament can slide through it without significant friction.

Figure 21:
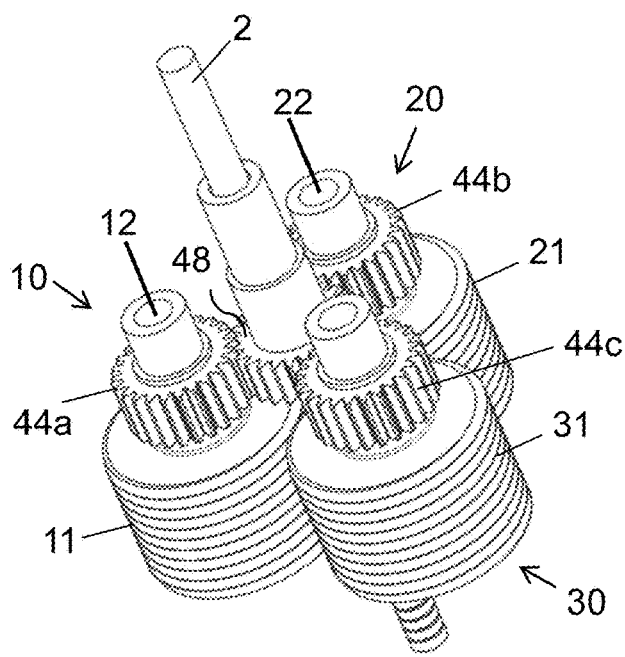

FIG. 21 is a perspective view showing the relative position of the rotatable components 10, 20, 30 and of the filament 2 and of the central gear wheel 48.

In this example, the central gear wheel 48 has exactly the same dimensions as the gear wheels 44a-44c of the rotatable components, and they all have 24 teeth, but this is not strictly necessary, and the system will also work if the central gear wheel 48 has different dimensions and would have a different number of teeth. If the rotatable components occupy a position of 120° relative to each other around the filament (see FIG. 20), then the number of teeth of both the central gearwheel 48 and the gearwheels 44 of the rotatable components is preferably an integer multiple of three. This makes it possible to mount the rotatable components with a mutual angular rotation of 0°, 120° and 240°, respectively (see also FIG. 31A and FIG. 31B).

FIG. 22 shows an exploded view of the three rotatable components and the central gearwheel of FIG. 22, and an assembly comprising these three rotatable components. Here too, the rotatable components 10, 20, 30 are preferably mounted in bearings 43 (top), 45 (bottom), which bearings are fixedly mounted in a carrier structure (also referred to as 'carrier'). In the example of FIG. 22, the carrier structure comprises a lower portion 46 and an upper portion 41 that can be attached to each other by means of bolts. As can now be understood, also in the second embodiment, the rotatable components are not driven directly, but indirectly. Since the ring gear 42 has been omitted, the components can still be driven in two ways:

(i) by rotating the central gearwheel 58 around the filament (or in practice: with respect to the pressure rollers, not shown in FIG. 22); or (ii) by rotating the lower portion 46 or the upper portion 41 of the assembly around the filament (or in practice: relative to the pressure rollers).

In both cases, the rotatable components will, as a result, rotate around their respective axes, and these axes will move around the filament.

Figure 23:
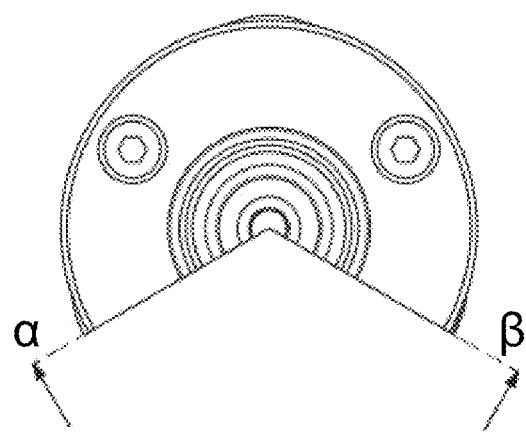

FIG. 23 shows a top view of FIG. 22 in which two planes alpha and beta are defined, and wherein a portion is cut away for illustrative purposes.

FIG. 24 shows a cross section of the assembly of FIG. 22 in the planes alpha and beta shown in FIG. 23.

Figure 25:
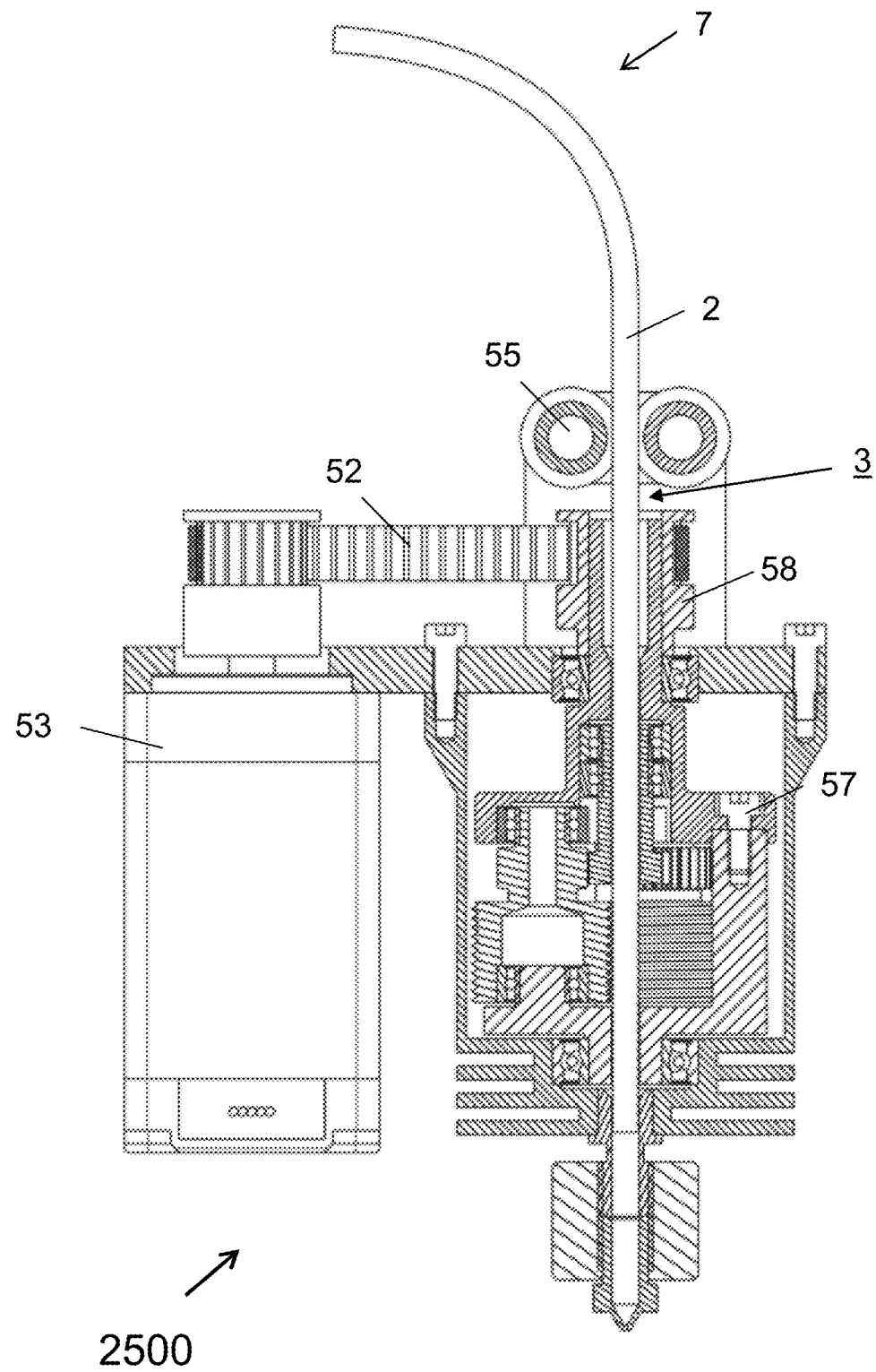
FIG. 25 shows a filament feed system comprising a light variant of the assembly of FIG. 24, namely with a timing-belt pulley.

FIG. 25 shows a filament feed system 2500 comprising an assembly according to the second embodiment, very similar to that of FIG. 20 to FIG. 24. As shown, the filament feed system 2500 comprises a motor 53 (e.g., a stepper motor) that drives a toothed belt 52, which in turn drives a timing-belt pulley 58, which in this example is connected to the upper portion 41 of the carrier structure.

As shown, here too, the filament 2 is guided through a rotation-limiting unit, e.g., between two pinch rollers 55, to limit or prevent rotation of the filament. These pinch rollers 55 are free-running, and therefore do not determine the speed at which the filament is advanced. Preferably, the filament 2 is also supplied via a bent curve from a filament spool (not shown). This bent curve also contributes to preventing torsion of the filament 2.

The embodiments have hitherto only been shown with a single-start thread (one helix). It should be understood that the single-start thread is not a limiting option but that further embodiments are possible with a multiple-start thread (multiple helices).

Figure 26:
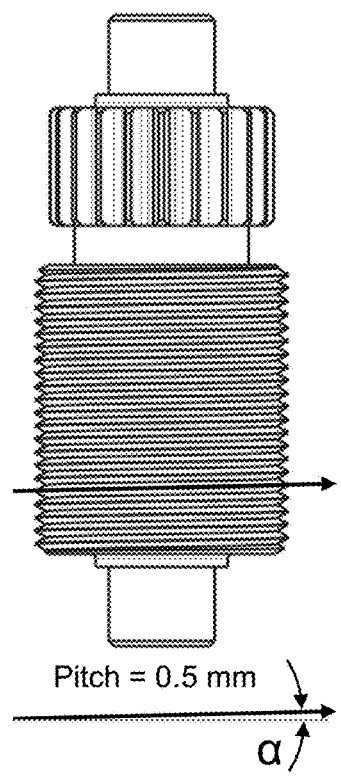
FIG. 26 to FIG. 29 show some examples of single-start thread, and multiple-start thread, with different pitch, that can be used in embodiments according to the present disclosure.
Figure 27:
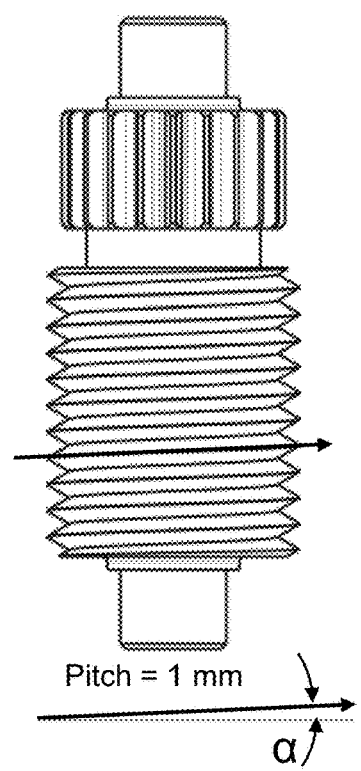
Figure 28:
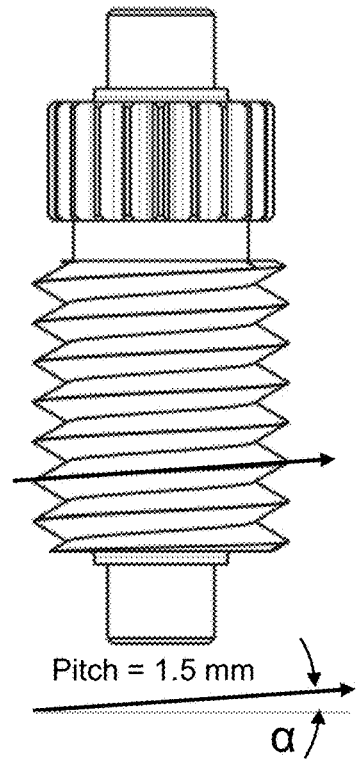

FIG. 26 to FIG. 28 show some examples of a rotatable component with a single-start thread, with a pitch of 0.5 mm or 1.0 mm or 1.5 mm respectively.

Figure 29:
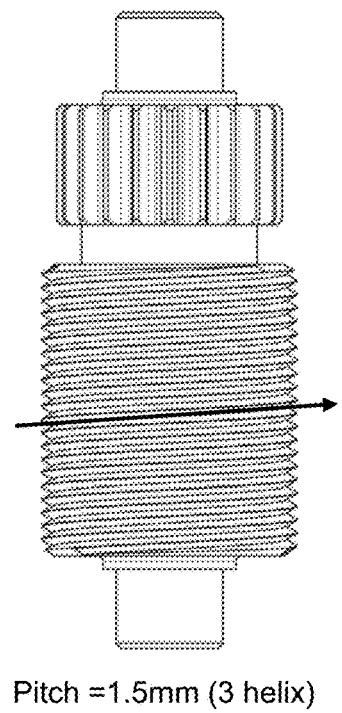

FIG. 29 shows a variant of the component of FIG. 28 with a pitch of 1.5 mm but with a multiple-start thread, in the example shown a triple-start thread.

Figure 30A:
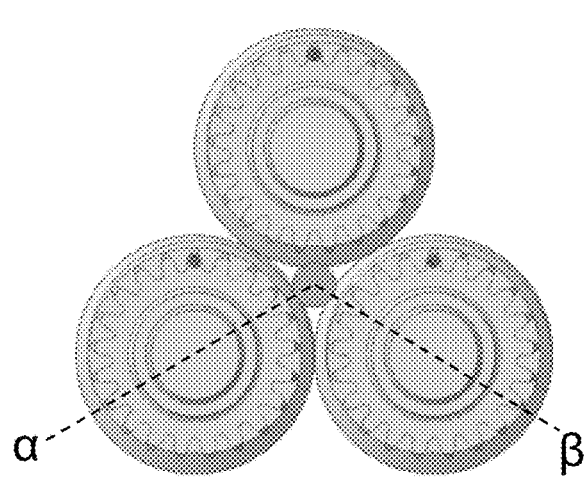
FIG. 30A, FIG. 30B, FIG. 31A, and FIG. 31B show examples of how rotatable components with single-start or multiple-start thread engage the filament, and form rings on the filament.
Figure 30B:
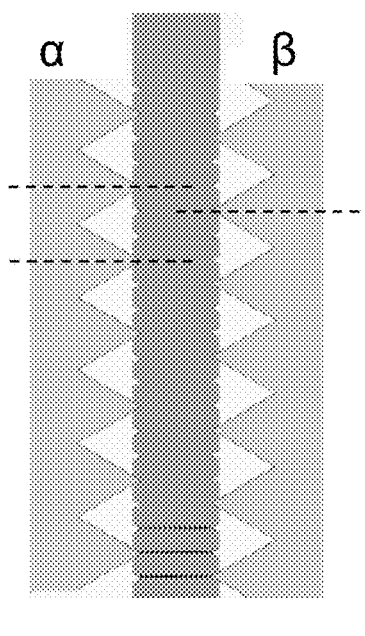

FIG. 30A is a schematic representation of an arrangement with three rotatable components, each with a single-start thread with lead 1.5 mm, the three components being oriented at the same angle in the carrier structure (as shown with a black dot). Since the components themselves are offset by 120° with respect to the filament, the screw threads of the different components engage with the filament at different heights, as shown in FIG. 30B. In other words, in this embodiment, three sets of tracks are formed in the filament. Thanks to the synchronization, these tracks remain at a predetermined distance from each other.

In a variant of FIG. 30A, (not shown) wherein the second component is rotated through 120° with respect to the first, and the third component through 240° with respect to the first, the screw threads of the three components will all run in the same series of circular tracks of the filament 2.

In another variant of FIG. 30A, (not shown), wherein the second component is rotated by 0° with respect to the first, and the third component is rotated by 240° with respect to the first, the screw threads of the first and the third component will run in the same series of circular tracks of the filament 2, but the second component will form its own series of tracks in the filament.

Figure 31A:
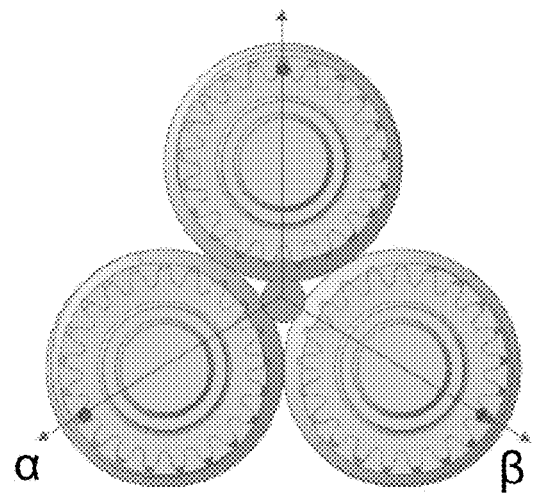

FIG. 31A is a schematic representation of an arrangement with three rotatable components, each with a triple-start thread of 1.5 mm. In the example, the three components are rotated 120° to each other, but since there are three helices, it makes no difference whether the components are rotated 0° or 120° or 240° relative to each other.

Figure 31B:
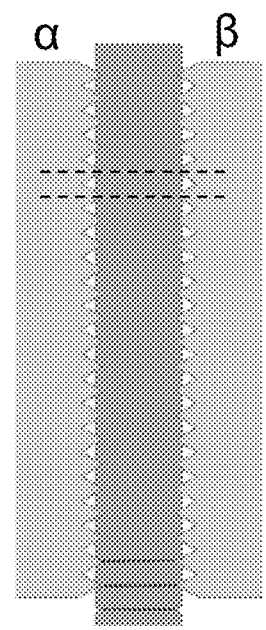

FIG. 31B shows that there are many more engagement points between each component and the filament, and that the teeth of the screw threads of all components run in all tracks.

Depending on the deformation properties of the filament (e.g.: plastic or elastic), a deeper penetration over a smaller number of engagement points may or may not be better than a less deep penetration over a larger number of engagement points, but the operation is essentially the same.

From this it can be understood that as long as the screw threads continue to run in the tracks despite an upward pressure force from the melting unit, there will be no significant 'slip' between the rollers and the filament, resulting in a perfectly linear behavior of the curve of FIG. 47, regardless of the filament speed set. Only when the opposing force becomes so large that the teeth of the screw threads are pressed out of the tracks, will slip occur. In the test rig of FIG. 43 with an ABS filament of 1.75 mm diameter, a nozzle of 0.4 mm and a temperature of 230° C., the behavior was substantially perfectly linear to a flow rate of approximately 13 mm$^3$/s.

Third Embodiment

FIG. 32 and FIG. 33 show a third illustrative embodiment of a feed mechanism 3200 according to the present disclosure. Not all parts are shown in FIG. 32 and FIG. 33, so as not to overload the figure.

This third embodiment can be seen as a variant of the first embodiment, with as main differences:

(i) that this embodiment comprises only two rotatable components with screw thread, arranged such that the filament is positioned exactly in the center between the first and second axis, and (ii) that the system further has two mechanical guides 30, 50 to hold the filament within the channel. These guides are not rotatable about their axis, but do rotate relative to the gearwheel 42. The filament 2 is substantially clamped between the two rotatable components 10, 20, with screw thread, and is moved by the screw threads of these two components in a similar manner as described above.

The two guides 30 and 50 are preferably at a small distance from the filament 2, and preferably exhibit very low friction with the filament 2. The latter can be realized in known ways, e.g. by choice of material (e.g. by using a plastic that exhibits low friction with the material of the filament 2), and/or by using smooth and/or polished and/or coated guides, or in other known ways.

Everything described above for the first embodiment also applies to this third embodiment, mutatis mutandis. The most important advantage, namely that there is mainly rolling friction between the rotatable components 10, 20 and the filament 2, also applies here.

Although some sliding friction occurs between the filament and the two guides 30, 50, the filament is preferably not clamped between these guides 30, 50. These guides only serve to hold the filament in place in the channel. The lateral force with which the filament is pressed against the mechanical guides is only a fraction of the radial force with which the first and second component press their screw threads into the filament.

Although not explicitly shown, an assembly similar to that of FIG. 9 and a filament drive system similar to that of FIG. 10 can also be constructed for this arrangement with only two rotatable components.

Although not explicitly shown, a variant of the arrangement of FIG. 32 and FIG. 33 without ring gear 42 but with an internal gear with an opening (as in the second embodiment) is also possible. This embodiment is especially suitable for filament diameters of at least 2.50 mm.

Fourth Embodiment

FIG. 34 to FIG. 42 show a fourth illustrative embodiment of an arrangement and assembly and filament feed system according to the present disclosure. Not all parts are shown in every drawing, so as not to overload the drawings.

When for the first, second and third embodiments it was said that the axes of the rotatable components are 'substantially parallel' to the channel, this means: perfectly parallel within a tolerance of at most ±0.5°, or at most ±0.4°, or at most ±0.3°, or at most ±0.25°, or at most ±0.20°.

The fourth embodiment can be seen as a variant of the first embodiment, with as main similarities that:

i) there are several points of engagement (different in the height direction) between each rotatable component and the filament (e.g. at least three or at least four or at least five);

ii) the filament is clamped between three rotatable components that are positioned relative to each other with an angular displacement of approximately 120°, whereby an automatic centering takes place;

iii) mainly 'rolling friction' occurs between the rotatable components (or 'rolls') and the filament, so that only a small moment of force is required to cause the rotatable components to roll substantially over the filament;

iv) that the 'sliding friction' is minimal or small, so that the filament is locally not or hardly heated by contact with the rotatable components, so that the tracks remain virtually intact and are not eroded.

The main differences with the first embodiment are:

i) that the rotatable components do not have a spiral or helical ridge or elevation, but a plurality of equidistant annular ridges or elevations, e.g. at least two, or at least three, or at least four or at least five ridges;

ii) that the axes of the rotatable components are not parallel to the channel, but that their carriers deliberately form crossing lines with an angle in the range from 1.0° to 9°, or in the range of 1.25° to 8°, or in the range from 1.5° to 8.0°, or in the range from 2.0° to 5.0°, e.g. approximately equal to 1.75°, or approximately equal to 2.0°, or approximately equal to 2.25°, or approximately equal to 2.5°, or approximately equal to 2.75°, or approximately equal to 3.0°, or approximately equal to 3.25°, or approximately equal to 3.5°, or approximately equal to 3.75°, or approximately equal to 4.0°, or approximately equal to 5° or approximately equal to 6° or approximately equal to 7°;

iii) that the angular rotations of the rotatable components about their axis do not have to be synchronized to prevent them from (slowly) forming warped grooves on the filament. It is sufficient that their positions show a fixed 'offset' (see FIG. 35). This is also one of the biggest advantages of this fourth embodiment, because it allows for a much simpler assembly. More specifically, both the ring gear 42 and the central gearwheel 48 can be omitted, as well as the gearwheels 44a-44c;

iv) the grooves on the filament will not form circular rings, but one or more spiral shapes.

Figure 35:
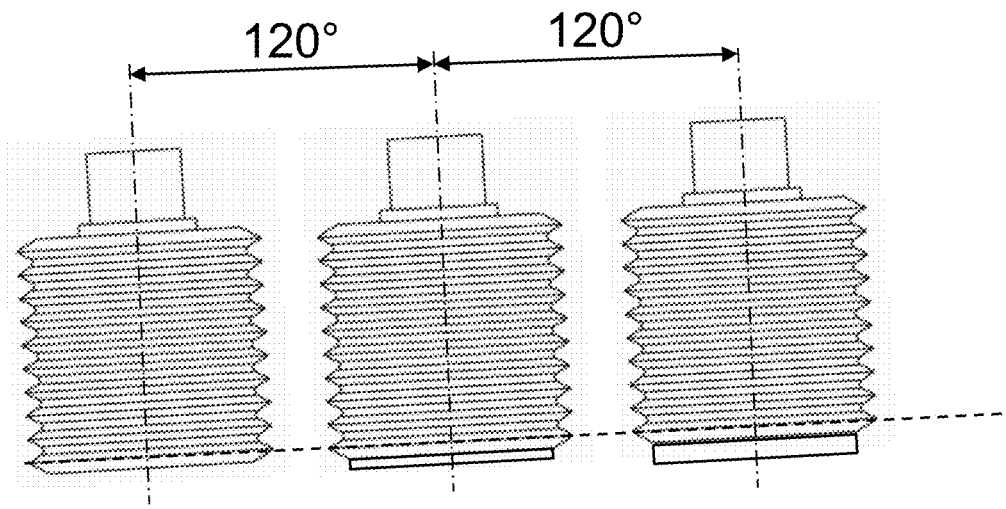

With reference to FIG. 35, a person skilled in the art will appreciate that in an assembly according to the fourth embodiment, the filament will not substantially differ in the contact points with the 'ridges' of the three rotatable components of FIG. 34 or in the 'screw threads' of the three rotatable components of FIG. 6. In both cases, the filament experiences a penetration of a disc-shaped or dish-shaped object at a certain angle of inclination (e.g. in the range from 1.0° to 8.0°).

Depending on the implementation there may be a slight difference in penetration depth, because 'straight' screw threads in principle engage equally deeply at the top and bottom, which is not the case for 'equally large circular ridges', but the penetration depth can be adjusted in both cases. In the case of screw threads, the thread may, for example, be conical. In the case of the circular ridges, rings with different diameters may be used (e.g., smaller diameter in the middle, larger diameter at the bottom and top of the rotatable component).

Regarding accuracy, it is important with single-start threaded rotatable components that the components exhibit an angular offset (as explained in FIG. 31A) in order to run in the same circular grooves on the filament. For the rotatable components with rings, the angular position of the component around its axis is not important, but the axial offset (see FIG. 35) is. If the three rotatable components are identical, and no offset is applied in the height direction (Z) between the rotatable components, then each rotatable component will form its own spiral groove (by rolling depression) on the filament, with the result that several such spiral grooves will be formed in the filament. If the grooves are too close together, they can warp and be damaged. This is detrimental to the accuracy.

By choosing a suitable offset in the height direction (Z) between the rotatable components, it is possible to make the rotatable components run in one and the same spiral groove. This allows the ridges to penetrate deeper into the filament, and thus to exert a higher radial pressure on the filament.

If the ridges are tapered (e.g. with a triangular or a truncated triangle or trapezoidal cross-section), then the filament will also show a greater tendency here to center the (spiral) grooves relative to the ridges. In this way all engagement points work together to achieve the same axial displacement of the filament.

Further optimization is possible by not giving the ridges of a rotatable component all the same outer diameter, but by using ridges with different outer diameters. Indeed, if all ridges have the same outer diameter, then one ridge will penetrate deeper into the filament than the other ridges, due to the angle of inclination between the axes and the filament. If desired, the penetration depth can be made approximately the same for the different ridges by appropriately changing the diameters.

It is of course also possible to choose the diameters such that the penetration depth gradually increases from the entrance to the exit of the channel. A person skilled in the art who has the advantage of the present disclosure can easily choose suitable diameters. Other considerations are of course also possible.

Regarding maximum throughput speed and linearity between requested (set) and actual obtained speed (or flow rate), the graph of FIG. 47 also applies to the fourth embodiment, as long as the ridges continue to run in the tracks. Only when the opposing force (e.g. from the melting unit) becomes so large that the ridges begin to run outside the already formed tracks, will the linearity be lost.

Referring to the figures of the fourth embodiment.

FIG. 34 shows the mutual position and orientation of three identical rotatable components 10, 20, 30 with a plurality of circular ridges, without vertical offset.

FIG. 35 shows the mutual position and orientation of three rotatable components 10, 20, 30, with vertical offset (drawn in an exaggerated manner for illustrative purposes), or of three different components with built-in offset. The offset can be selected such that the ridges of the various components 10, 20, 30 engage in the same spiral groove on the filament. It is noted that the ridges of the components of FIG. 35 are fairly close to each other, but that does not necessarily have to be the case.

Figure 36:
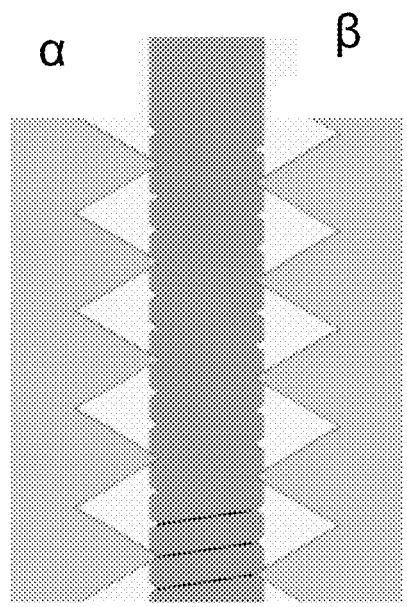
Figure 37:
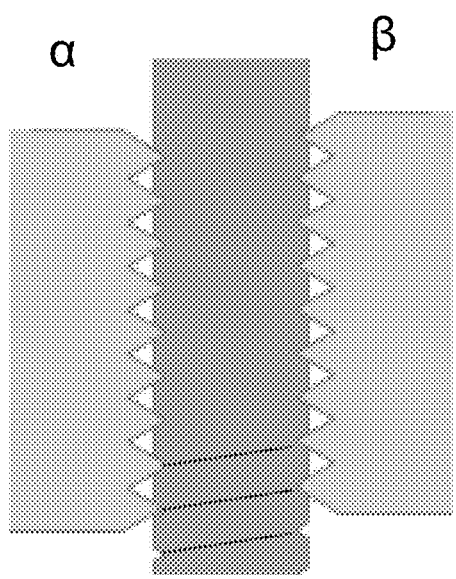

FIG. 36 and FIG. 37 show examples of how rotatable components with rings arranged as in FIGS. 34 and 35 engage the filament, and form one or more spirals or helices on the filament, thereby moving the filament.

Figure 38A:
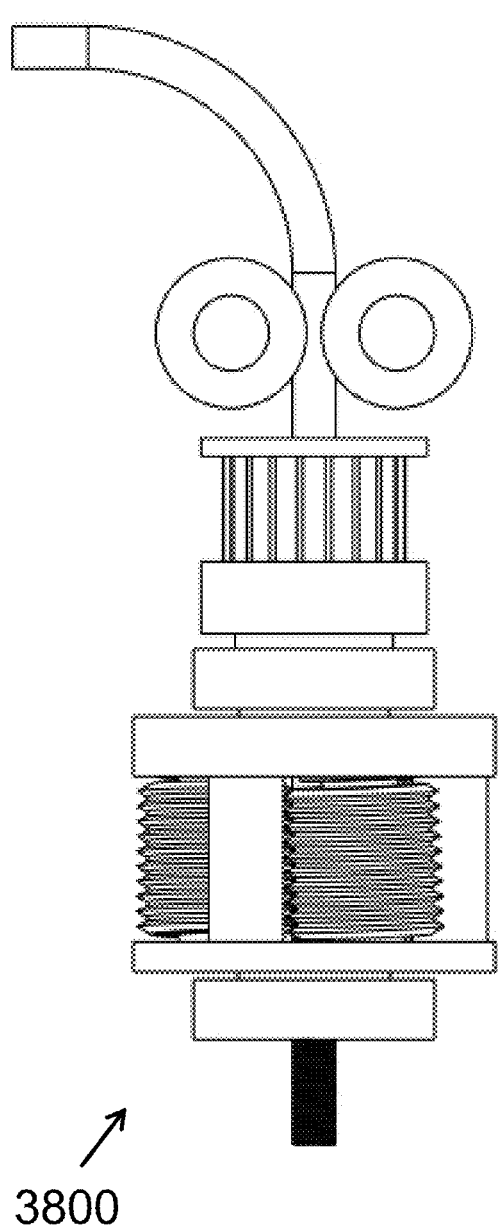
FIG. 38A and FIG. 38B show an illustrative filament drive system based on the arrangement of FIG. 34, in front view and in cross sectional view.
Figure 38B:
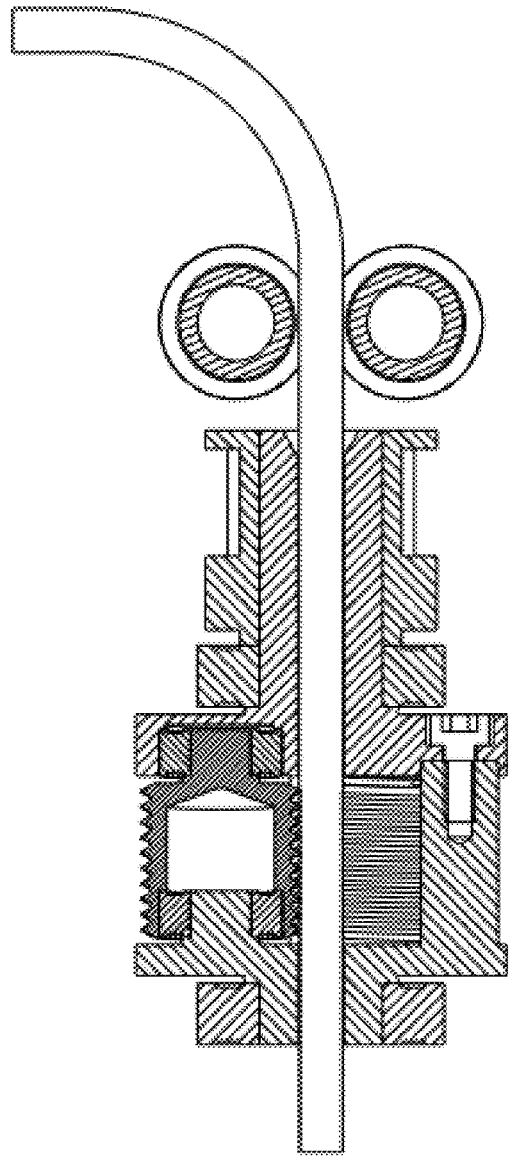

FIG. 38A and FIG. 38B show an illustrative filament drive system based on the arrangement of FIG. 34, in perspective view and in cross sectional view. This assembly or filament drive system can be made more compact than that according to the first embodiment, because the gear wheels can be omitted.

Figure 39:
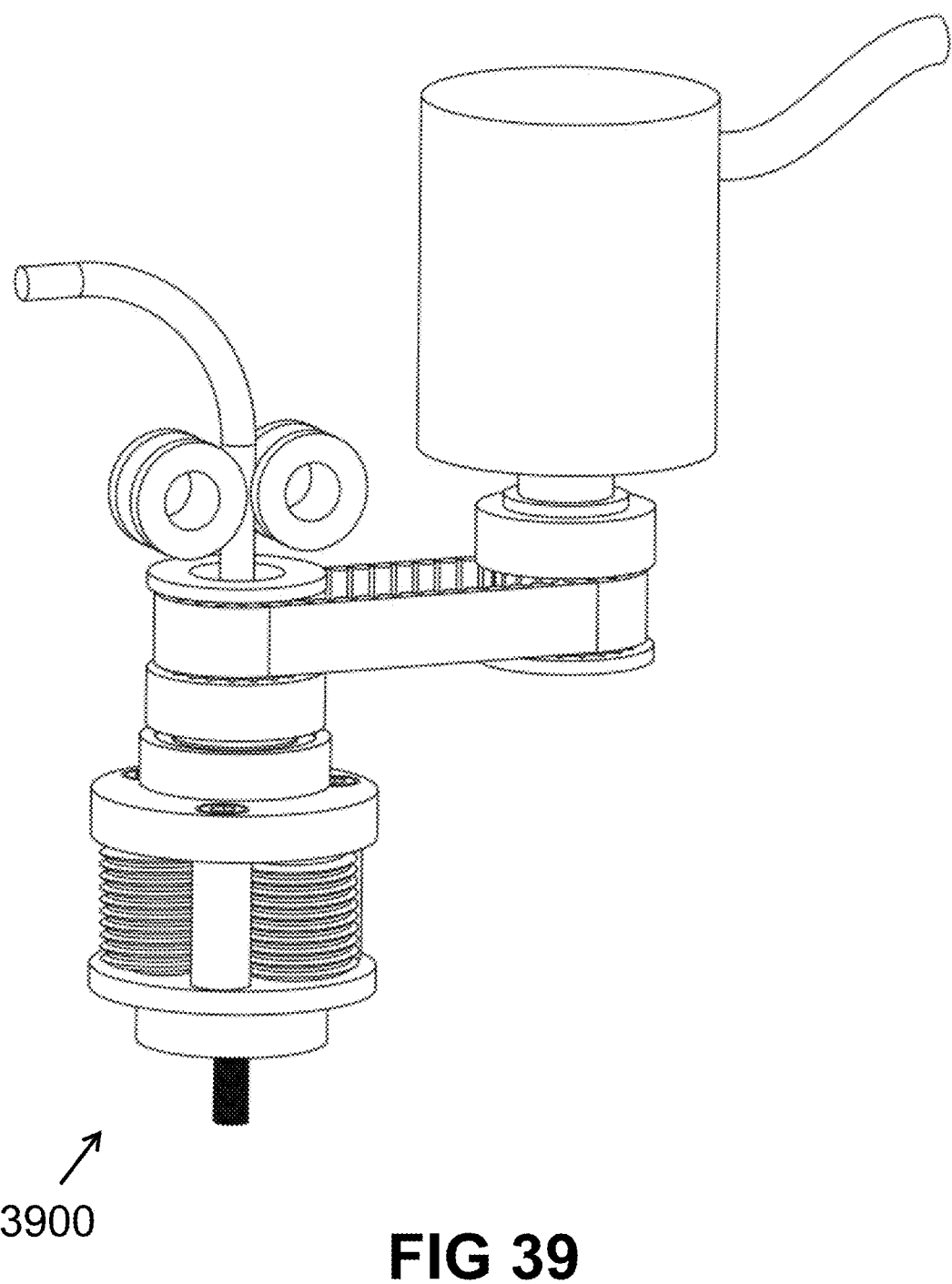

FIG. 39 shows the filament drive system of FIG. 38A with synchronous drive.

Figure 40:
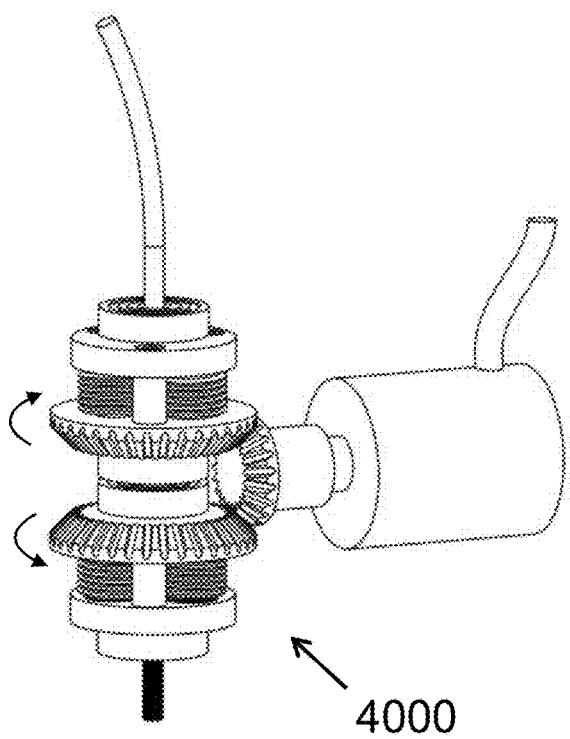
Figure 41:
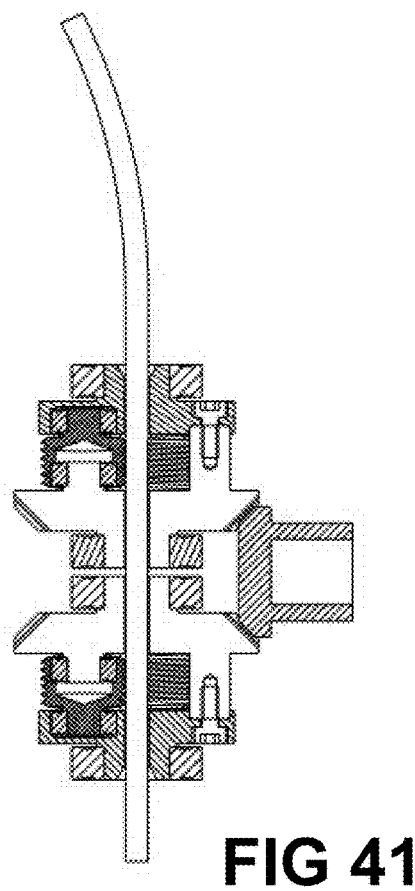
Figure 42:
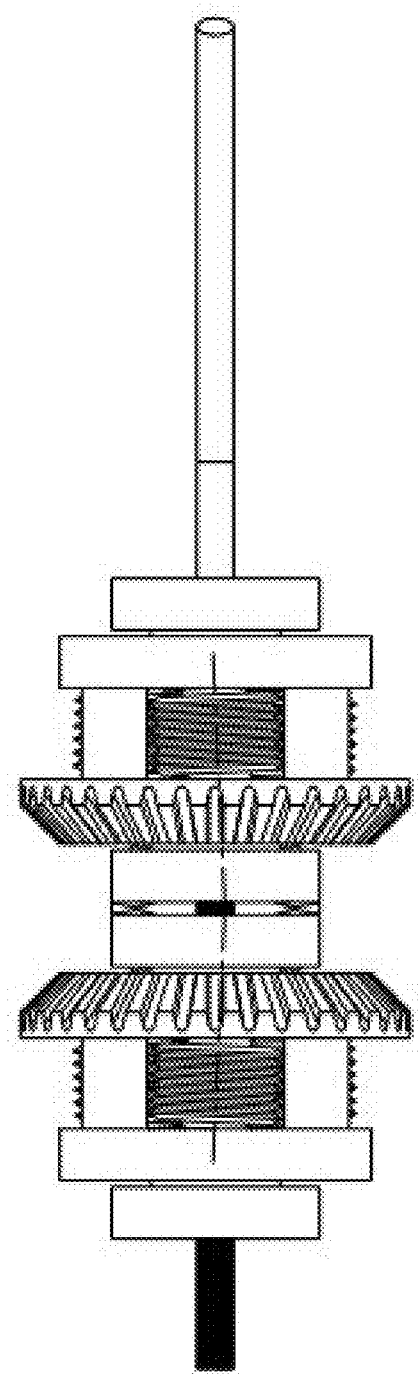

FIG. 40 to FIG. 42 show a variant of the filament drive system of FIG. 39, having two assemblies according to the fourth embodiment, driven in opposite direction. The drive wheel of the upper assembly is driven clockwise with respect to the rest of the assembly, while the drive wheel of the lower assembly is driven anticlockwise with respect to the rest of the assembly, or vice versa. An advantage of this drive system is that the torsion exerted on the segment by the upper assembly is largely offset by the torsion exerted by the lower assembly.

FIG. 40 shows the filament drive system in perspective view.

FIG. 41 shows a cross section of the filament drive system of FIG. 40.

FIG. 42 is a front view of the filament drive system of FIG. 40. It clearly indicates that the axes of the rotatable components slope in a different direction. The two assemblies are synchronized by being driven by the same motor. Depending on a shift between the first and second assembly, it can be chosen that the lower assembly runs in the same tracks as the upper assembly or not.

In the figures shown, the filament is supplied in a bent curve from a filament roll. Optionally also here two pinch rollers (not shown) can be added to the system to further limit the torsion.

Figure 43:
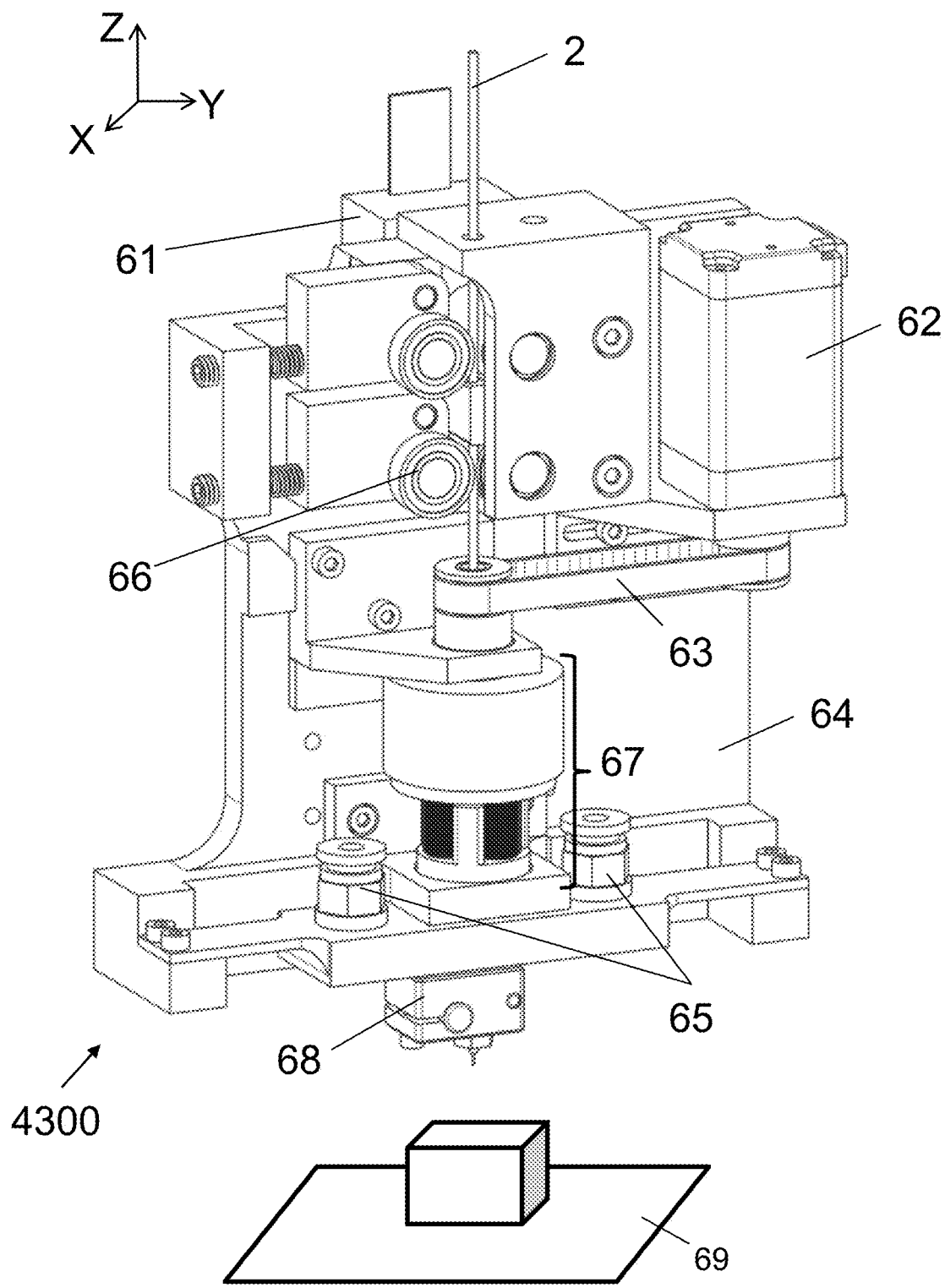
FIG. 43 shows a test rig with a filament drive system according to FIG. 10, in perspective view.

FIG. 43 shows a test rig of a filament feed system according to an embodiment of the present disclosure, in perspective view. The filament feed system of FIG. 43 comprises a base plate 64 to which is attached an assembly 67, which is driven by a stepper motor 62 by means of a synchronous drive belt 63.

A filament of a thermoplastic plastic material (e.g. ABS) is supplied from a filament roll (not shown), preferably via a bent curve (not shown) to a pressure roller assembly or pinch roller assembly 66. The system further comprises a heating element 68 ('liquefier') to melt the filament, with a temperature sensor and a nozzle. Although not strictly necessary for operation, the filament feed system also has an optional encoder 61 (e.g., an optical encoder) to measure the filament throughput speed. This was used to measure the graph shown in FIG. 47. Furthermore, the system of FIG. 43 comprises two optional connections 65 for water cooling. The filament feed system can be movably arranged in known ways (see e.g. FIG. 3) in a three-dimensional space, e.g. to form a 3D printer. In this way, a 3D object can be printed layer by layer, under the control of an external computer.

FIG. 44 to FIG. 46 show a top view of some illustrative pressure rollers or pinch rollers such as may be used in embodiments according to the present disclosure.

The pinch rollers of FIG. 44 and FIG. 45 are configured to make at least one raised groove in the filament, and due to engagement with this groove, the pinch rollers can prevent the torsion from extending beyond (e.g. above) the pinch rollers.

The pinch rollers of FIG. 46 have a V shape configured to clamp the filament between four surface segments.

FIG. 47 shows a graph showing the ratio of the delivered amount of filament material based on the requested (or set) amount of material, based on data measured with the test rig of FIG. 43, using a filament feed mechanism according to the first embodiment, and using a thermoplastic filament.

Probably one of the most important advantages of embodiments herein is that the supply system remains linear (or the ratio of delivered quantity of material to requested quantity of material remains constant) regardless of the throughput speed, up to a certain value (approximately equal to 13 mm$^3$/s in the example). This maximum throughput speed may differ when using a different type of material, and/or a different filament thickness, and/or when choosing a different nozzle of the heating element, but the fact is that the measured throughput speed shows almost 100% linearity up to a certain value.

The same test rig with the same heating element and the same nozzle and the same filament but with a supply system with pressure rollers (pinch feeder system) showed the behavior according to the dotted curve.

It will be clear that a higher speed, but in particular also a higher quality can be obtained by using a filament feed system according to the present disclosure. As far as known to the inventors, the majority of 3D printers work with a pressure roller system, perhaps even more than 90%. The importance of the systems and methods described herein should therefore not be underestimated.

As can be seen, using a feed mechanism as proposed by the present disclosure, the actual printing speed can follow the requested printing speed up to a deposition rate of about 10 mm$^3$/s, as opposed to only about 4 mm$^3$/s using a classical pinch roller system with the same filament. This means a huge improvement over a classical feed system, in terms of speed and/or in terms of quality of the end product. Finally, In all the aforementioned embodiments, the rotatable components may be made of, for example, brass, steel, hardened steel, aluminium alloys, titanium, or titanium alloys. A coating can optionally be applied to increase the service life, for example a hard coating that offers good resistance to wear.

REFERENCES d1 distance from first axis to channel
d2 distance from second axis to channel
d3 distance from third axis to channel
α, β plane
2 filament
3 entrance
4 exit
5 channel
6 groove (in filament)
7 curved segment (of the filament)
10 first component
11 first external screw thread
12 first axis
13 first gear
20 second component
21 second external screw thread
22 second axis
23 second gearwheel
30 third component
31 third external screw thread
32 third axis
33 third gearwheel
41 (first portion of) carrier
42 ring gear (also called 'toothed ring')
43 bearings or bushes or sleeves
44 planet gear or planet gears
45 bearings or bushes or sleeves
46 (second portion of) carrier
47 planetary-gear carrier
48 central gearwheel
49 central opening or central passage
50 fourth component 51 recesses in the carrier
52 toothed belt
53 motor (e.g. stepper motor)
54 motor shaft
55 pinch rollers
56 bearing(s)
57 housing
58 timing-belt pulley
61 encoder (to measure speed)
62 stepper motor
63 synchronous drive belt
64 base plate, housing
65 water cooling connection
66 pressure roller assembly (or: pinch roller assembly)
67 filament feed mechanism
68 heating element (with temperature sensor and nozzle)
71 metal and/or ceramic particles
72 thermoplastic binder
73 outer shell
100 extrusion-based production system
101 filament spool
102 filament
103 extruder
104 heating unit ('liquefier')
105 nozzle
106 substrate
300 extrusion-based production system
312 building chamber
314 substrate
316 gantry
318 extrusion head
320 filament feed source
322 drive mechanism
324 filament
330 rotatable component
332 internal screw thread surface
334 electric motor
900 assembly
1000 filament feed system
1200 filament feed system
1300 planetary gear drive
2200 assembly
2500 filament feed system
3200 arrangement
3400 arrangement
3400 test rig
3800 assembly
3900 filament feed system
4000 filament feed system

What is claimed is:

1. An extrusion-based production system comprising:
a filament roll with a filament to be extruded, wherein the filament to be extruded is selected from (a) a filament of a thermoplastic material, or (b) a filament comprising a powder and a thermoplastic binder, where the powder is a metal powder, a ceramic powder, or a combination of a metal powder and a ceramic powder;
at least one assembly adapted to supply the filament, and rotatable about the filament, the at least one assembly comprising:
an entrance adapted to receive the filament;
an exit adapted to deliver the filament, the entrance and the exit defining a channel within which the filament is moveable;
at least two rotatable components comprising a first rotatable component and a second rotatable component,
wherein:
the channel is at least partially located between the first component and the second component;
the first rotatable component is rotatable about a first axis and has first external ridges;
the first axis is located at a first distance from the channel such that the first external ridges penetrate at least partially into the channel;
the second rotatable component is rotatable about a second axis different from the first axis and has second external ridges;
the second axis is located at a second distance from the channel such that the second external ridges penetrate at least partially into the channel;
the first rotatable component and the second rotatable component are mounted such that, when the filament is inserted into the channel and when the at least one assembly is rotated relative to the filament, the first rotatable component rotates about the first axis, and the second rotatable component rotates about the second axis, and the first axis and the second axis move about the filament in such a manner that the first rotatable component and the second rotatable component roll over a surface of the filament, while the first external ridges and the second external ridges penetrate the filament about 0.05 mm to about 0.25 mm.

2. The extrusion-based production system of claim 1, wherein each of the at least two rotatable components is in contact with the filament by at least three different ridge segments that are axially offset with respect to each other.

3. The extrusion-based production system of claim 1, wherein:
the at least one assembly further comprises a ring gear; and
each of the at least two rotatable components further comprise a gearwheel that engages the ring gear to cause at least the first component and the second component to rotate synchronously about their respective axes.

4. The extrusion-based production system of claim 1, wherein:
the at least one assembly further comprises a central gearwheel with a central opening for passage of the filament; and
each of the at least two rotatable components comprise a gearwheel that engages the central gearwheel to cause the first rotatable component and the second rotatable component to rotate synchronously around their respective axes.

5. The extrusion-based production system of claim 1, wherein:
the at least one assembly further comprises a third rotatable component and a fourth rotatable component positioned such that the channel is at least partially located between the first rotatable component, the second rotatable component, the third rotatable component, and the fourth rotatable component; and
the third rotatable component and the fourth rotatable component each have a surface that touches the channel.

6. The extrusion-based production system of claim 1, wherein:
the first axis of the at least one assembly is substantially parallel to the channel; and
the second axis is substantially parallel to the channel; and the first external ridges form a first external screw thread; and the second external ridges form a second external screw thread; and the at least one assembly further comprises gearwheels that synchronize movements of the at least two rotatable components.

7. The extrusion-based production system of claim 6, wherein:
the at least one assembly further comprises a third rotatable component with a third external screw thread, the third rotatable component being rotatable about a third axis different from the first axis and the second axis, wherein the third axis is substantially parallel to the channel and is situated at such a distance from the channel that the third external screw thread penetrates at least partially into the channel;
the channel is at least partially located between the first rotatable component, the second rotatable component, and the third rotatable component; and
the third rotatable component is mounted such that, when the filament is inserted into the channel and when the at least one assembly is rotated relative to the filament, the third rotatable component rolls over a surface of the filament.

8. The extrusion-based production system of claim 1, wherein:
the first axis of the at least one assembly is arranged to cross the filament at an angle of 1.0° to 9.0°;
the second axis is arranged to cross the filament at an angle of 1.0° to 9.0°; and
the first external ridges form a plurality of first rings; and
the second external ridges form a plurality of second rings.

9. The extrusion-based production system of claim 8, wherein:
the at least one assembly further comprises a third rotatable component rotatable about a third axis different from the first axis and the second axis; and
the third axis is arranged to cross the filament at an angle of 1.0° to 9.0°.

10. The extrusion-based production system of claim 9, wherein:
the third rotatable component has third external ridges; and
the first rotatable component, second rotatable component, and the third rotatable component are shaped and positioned such that at least one groove formed by the first external ridges, second external ridges, and the third external ridges form a single helix, or two individual helices, or three individual helices.

11. The extrusion-based production system of claim 8, wherein the rings of each rotatable component, considered separately, are at a constant distance from each other.

12. The extrusion-based production system of claim 8, wherein:
the plurality of rings all have a same external diameter; or
at least one of the plurality of rings has a first outer diameter and wherein at least one other of the plurality of rings has a second outer diameter different from the first outer diameter.

13. The extrusion-based production system, of claim 1, further comprising at least one rotation limiting unit positioned at the entrance or at the exit of the at least one assembly to limit torsion of the filament.

14. The extrusion-based production system, of claim 1, further comprising at least one pressure roller assembly positioned at the entrance or at the exit of the at least one assembly to limit filament torsion.

15. The extrusion-based production system of claim 1, wherein the filament roll is arranged such that the filament from the filament roll is inserted into the entrance of the at least one assembly according to a bent curve.

16. The extrusion-based production system of claim 1, further comprising at least one drive mechanism adapted to rotate the at least one assembly relative to the filament.

17. The extrusion-based production system of claim 1, wherein the at least one assembly comprises:
a first assembly adapted to move the filament in a first direction; and
a second assembly, adapted to move the filament in the first direction; and wherein the extrusion-based production system further comprises a drive mechanism adapted to rotate the rotatable components of the first assembly in a first direction relative to the filament, and further adapted to rotate the rotatable components of the second assembly in a second direction relative to the filament, opposite to the first direction, so as to reduce or substantially eliminate torsional forces exerted by the first assembly.

18. The extrusion-based production system of claim 16, wherein the drive mechanism further comprises an electric motor adapted to rotate the at least one assembly relative to the filament.

19. The extrusion-based production system of claim 18, wherein the drive mechanism further comprises a drive belt, that couples the at least one assembly to the electric motor.

20. The extrusion-based production system of claim 18, wherein the electric motor is a motor having a hollow shaft, wherein the hollow shaft is configured to receive the filament, and the motor is configured to rotate the at least one assembly relative to the filament.

21. The extrusion-based production system of claim 15, further comprising a control unit, that is communicatively connectable with an external computer and is adapted to receive information for controlling the at least one drive mechanism.

22. The extrusion-based production system of claim 1, further comprising a heating element, adapted to melt the thermoplastic filament leaving the exit.

23. A method of feeding through a filament in an extrusion-based production system comprising:
a filament roll with a filament to be extruded, wherein the filament to be extruded is selected from (a) a filament of a thermoplastic material, or (b) a filament comprising a powder and a thermoplastic binder, where the powder is a metal powder, a ceramic powder, or a combination of a metal powder and a ceramic powder;
at least one assembly, the at least one assembly comprising:
an entrance adapted to receive the filament to be extruded;
an exit adapted to deliver the filament, wherein the entrance and the exit define a channel within which the filament is movable; and
at least two rotatable components comprising a first rotatable component and a second rotatable component;
wherein:
the channel is at least partially located between the first rotatable component and the second rotatable component;
the first rotatable component is rotatable about a first axis and has first external ridges;

the first axis is located at a first distance from the channel such that the first external ridges penetrate at least partially into the channel;

the second rotatable component is rotatable about a second axis different from the first axis and has second external ridges, the second axis is located at a second distance from the channel is located such that the second external ridges penetrate at least partially into the channel;

the method comprising:

introducing the filament into the channel;

rotating the first rotatable component about the first axis; and rotating the second rotatable component about the second axis, moving the first axis and the second axis around the filament in such a way that the first rotatable component and the second rotatable component roll over a surface of the filament while the first external ridges and the second external ridges penetrate approximately 0.05 mm to approximately 0.25 mm into the filament.

* * * * *